United States Patent
Kawasaki et al.

(10) Patent No.: US 10,447,582 B2
(45) Date of Patent: Oct. 15, 2019

(54) COMMUNICATION CONTROL DEVICE, WIRELESS DEVICE, COMMUNICATION CONTROL SYSTEM, COMMUNICATION CONTROL METHOD AND PROGRAM

(71) Applicant: ICOM INCORPORATED, Osaka-shi, Osaka (JP)

(72) Inventors: Hiroshi Kawasaki, Osaka (JP); Yuma Oda, Osaka (JP); Yoshiaki Miyakoshi, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 15/759,463

(22) PCT Filed: Feb. 9, 2017

(86) PCT No.: PCT/JP2017/004683
§ 371 (c)(1),
(2) Date: Mar. 12, 2018

(87) PCT Pub. No.: WO2017/163645
PCT Pub. Date: Sep. 28, 2017

(65) Prior Publication Data
US 2019/0007304 A1   Jan. 3, 2019

(30) Foreign Application Priority Data
Mar. 25, 2016   (JP) .................................. 2016-062464

(51) Int. Cl.
*H04L 12/703* (2013.01)
*H04M 11/00* (2006.01)
(Continued)

(52) U.S. Cl.
CPC .............. *H04L 45/28* (2013.01); *H04L 45/72* (2013.01); *H04L 63/0846* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2004/0100977 A1* | 5/2004 | Suzuki | H04L 45/7453 370/401 |
| 2010/0142560 A1* | 6/2010 | Sharivker | H04L 29/12839 370/475 |
| 2013/0170492 A1* | 7/2013 | Lu | H04L 61/6022 370/390 |

FOREIGN PATENT DOCUMENTS

| | | |
|---|---|---|
| JP | 2006-019775 | 1/2006 |
| JP | 2010-212749 | 9/2010 |

(Continued)

OTHER PUBLICATIONS

International Search Report dated May 9, 2017 from corresponding International PCT Application PCT/JP2017/004683, 2 pages.

*Primary Examiner* — Lakeram Jangbahadur
(74) *Attorney, Agent, or Firm* — Ohlandt, Greeley, Ruggiero & Perle, L.L.P.

(57) ABSTRACT

A communication control device includes an association table updater and a correction packet transmitter. The association table updater updates, when receiving from a first wireless device a packet containing an identification number of a first communication terminal connected to the first wireless device, an association table storing an address of the first wireless device and the identification number of the first communication terminal. The correction packet transmitter transmits, when a packet received from a second wireless device to which a second communication terminal is connected contains an address of the second wireless device, an identification number of the second communication terminal, and an identification number indicating a destination of the packet, and when the identification num- (Continued)

ber indicating the destination is the identification number of the first communication terminal stored in the association table, a correction packet containing the address of the second wireless device and the identification number of the second communication terminal to the first wireless device after the packet is transmitted to the first wireless device.

6 Claims, 18 Drawing Sheets

(51) Int. Cl.
| | | |
|---|---|---|
| *H04W 8/26* | (2009.01) | |
| *H04W 40/34* | (2009.01) | |
| *H04W 76/11* | (2018.01) | |
| *H04L 12/721* | (2013.01) | |
| *H04L 29/06* | (2006.01) | |
| *H04W 4/48* | (2018.01) | |
| *H04W 12/06* | (2009.01) | |
| *H04L 29/12* | (2006.01) | |

(52) U.S. Cl.
CPC .............. *H04M 11/00* (2013.01); *H04W 4/48* (2018.02); *H04W 8/26* (2013.01); *H04W 12/0605* (2019.01); *H04W 40/34* (2013.01); *H04W 76/11* (2018.02); *H04L 61/103* (2013.01); *H04L 61/6022* (2013.01)

(56) References Cited

FOREIGN PATENT DOCUMENTS

| | | |
|---|---|---|
| JP | 2013-197873 | 9/2013 |
| JP | 2015-167268 | 9/2015 |

* cited by examiner

ASSOCIATION TABLE 21, 51

| No. | IP ADDRESS | TERMINAL IDENTIFICATION NUMBER (MAC ADDRESS) | ... |
|---|---|---|---|
| 1 | 10.0.0.20 | MAC-B | ... |
| 2 | 10.0.0.20 | MAC-D | ... |
| 3 | 10.0.0.30 | MAC-C | ... |
| 4 | 10.0.0.40 | MAC-N | ... |
| 5 | 10.0.0.50 | MAC-M | ... |
| 6 | 127.0.0.1 | MAC-A | ... |
| ... | ... | ... | ... |

AUTHENTICATION TABLE 22

| No. | LTE IDENTIFICATION NUMBER (ICCID) | IP ADDRESS | POWER | LAST TRANSMISSION TIME | ... |
|---|---|---|---|---|---|
| 1 | ICCID1 | 10.0.0.20 | ON | 2016.03.03 10:00:10 | ... |
| 2 | ICCID2 | — | OFF | 2016.03.03 09:20:30 | ... |
| 3 | ICCID3 | 10.0.0.30 | ON | 2016.03.03 10:00:20 | ... |
| 4 | ICCID4 | — | — | — | ... |
| ... | ... | ... | ... | ... | ... |

KEEP-ALIVE PACKET

| DESTINATION IP ADDRESS | SOURCE IP ADDRESS | PASSWORD |
|---|---|---|
| 10.0.0.10 | 10.0.0.20 | ICCID1 + PASSWORD1 |

FIG. 10A

IP PACKET CONTAINING ASSOCIATION TABLE DELETING PACKET

| DESTINATION IP ADDRESS | SOURCE IP ADDRESS | ASSOCIATION TABLE DELETING PACKET | | |
|---|---|---|---|---|
| 10.0.0.20 | 10.0.0.10 | FLAG | COUNT | IP ADDRESS 1 TO BE DELETED |
| | | 2 | 1 | 10.0.0.40 |

FIG. 10B

GENERAL FORMAT OF ASSOCIATION TABLE DELETING PACKET

| FLAG | COUNT | IP ADDRESS 1 TO BE DELETED | IP ADDRESS 2 TO BE DELETED | ... |
|---|---|---|---|---|
| 2 | NUMBER OF DELETIONS | ... | ... | ... |

FIG. 14

IP PACKET CONTAINING RECEIVED DATA FROM LTE NETWORK

| DESTINATION IP ADDRESS | SOURCE IP ADDRESS | PAYLOAD OF UDP | | | |
|---|---|---|---|---|---|
| | | FLAG | DESTINATION TERMINAL IDENTIFICATION NUMBER | SOURCE TERMINAL IDENTIFICATION NUMBER | PAYLOAD OF TERMINAL TRANSMISSION PACKET |
| 10.0.0.30 | 10.0.0.10 | 2 | MAC-C | MAC-B | PAYLOAD |

{ TERMINAL TRANSMISSION PACKET }

FIG. 20A

ASSOCIATION TABLE UPDATING PACKET TO IN-VEHICLE WIRELESS DEVICE 3A

| DESTINATION IP ADDRESS | SOURCE IP ADDRESS | ASSOCIATION TABLE UPDATING PACKET | | |
|---|---|---|---|---|
| 10.0.0.20 | 10.0.0.10 | FLAG | IP ADDRESS AFTER CHANGE | INTENDED TERMINAL IDENTIFICATION NUMBER |
| | | 1 | 10.0.0.30 | MAC-C |

FIG. 20B

ASSOCIATION TABLE UPDATING PACKET TO IN-VEHICLE WIRELESS DEVICE 3B

| DESTINATION IP ADDRESS | SOURCE IP ADDRESS | ASSOCIATION TABLE UPDATING PACKET | | |
|---|---|---|---|---|
| 10.0.0.30 | 10.0.0.10 | FLAG | IP ADDRESS AFTER CHANGE | INTENDED TERMINAL IDENTIFICATION NUMBER |
| | | 1 | 10.0.0.20 | MAC-B |

COMMUNICATION CONTROL DEVICE, WIRELESS DEVICE, COMMUNICATION CONTROL SYSTEM, COMMUNICATION CONTROL METHOD AND PROGRAM

TECHNICAL FIELD

The present disclosure relates to a communication control device, a wireless device, a communication control system, a communication control method, and a program.

BACKGROUND ART

With widespread use of smartphones and tablets, mobile communication technologies like long term evolution (LTE) and data communication technologies like wireless local area network (LAN) are broadly becoming popular. Such various data communication technologies have advantages and disadvantages. For example, when the LTE is compared with the wireless LAN, the LTE has a wide radio coverage area, while the wireless LAN is low in cost for fast-speed communication.

Hence, communication techniques combining multiple data communication technologies have been developed in order to make full use of advantages of respective technologies. For example, Patent Literature 1 discloses a technique of enabling a communication terminal, which does not have an interface to be connected to a mobile communication network like LTE but has an Internet Protocol (IP) interface, to utilize a service over the mobile communication network.

CITATION LIST

Patent Literature

Patent Literature 1: Unexamined Japanese Patent Application Kokai Publication No. 2013-197873

SUMMARY OF INVENTION

Technical Problem

A system disclosed in Patent Literature 1 enables the communication terminal without an interface for connection to the mobile communication network to utilize a service over the mobile communication network. When, however, a communication is attempted between such communication terminals, a base station needs to be compatible with layer 2 tunneling protocol (L2TP) or the like so as to relay the communication between the communication terminals, and there is a disadvantage such that the load of the entire system including the base station device becomes large.

The present disclosure has been made in view of the foregoing circumstances, and an objective of the present disclosure is to reduce a system load when a communication is made between communication terminals.

Solution to Problem

In order to accomplish the above objective, a communication control device according to a first aspect of the present disclosure includes:

an association table updater that updates, when receiving from a first wireless device a packet containing an identification number of a first communication terminal connected to the first wireless device, an association table storing an address of the first wireless device and the identification number of the first communication terminal in association with each other; and a correction packet transmitter that transmits, when a packet received from a second wireless device to which a second communication terminal is connected contains an address of the second wireless device, an identification number of the second communication terminal, and an identification number indicating a destination of the packet, and when the identification number indicating the destination is the identification number of the first communication terminal stored in the association table, a correction packet containing the address of the second wireless device and the identification number of the second communication terminal to the first wireless device after the packet is transmitted to the first wireless device.

Preferably, the correction packet transmitter further transmits, to the second wireless device, a correction packet containing the address of the first wireless device and the identification number of the first communication terminal.

Preferably, the identification number of the communication terminal is a MAC address of the communication terminal.

A wireless device according to a second aspect of the present disclosure includes:

an association table updater that updates, when a received packet contains an address of a source wireless device and an identification number of a communication terminal connected to the source wireless device, an association table that stores the address of the source wireless device and the identification number of the communication terminal in association with each other, and a destination setter that sets the address of the source wireless device obtained from the association table as a destination of a packet addressed to the communication terminal.

Preferably, the wireless device further includes:

a correction packet obtainer that obtains a correction packet for correcting the address of the source wireless device stored in the association table; and an association table corrector that corrects, among addresses of wireless devices stored in the association table, an address of a wireless device corresponding to the identification number of the communication terminal contained in the correction packet obtained by the correction packet obtainer, to the address of the wireless device contained in the correction packet.

Preferably, the identification number of the communication terminal is a MAC address of the communication terminal.

A communication control system according to a third aspect of the present disclosure includes a communication control device and a plurality of wireless devices, in which the communication control device includes:

an association table updater that updates, when receiving from a first wireless device a packet containing an identification number of a first communication terminal connected to the first wireless device, an association table storing an address of the first wireless device and the identification number of the first communication terminal in association with each other; and a correction packet transmitter that transmits, when a packet received from a second wireless device to which a second communication terminal is connected contains an address of the second wireless device, an identification number of the second communication terminal, and an identification number indicating a destination of the packet, and when the identification number indicating the destination is the identification number of the first communication terminal stored in the association table, a correction packet containing the address of the second wireless device and the identification number of the second communication terminal to the first wireless device after the packet is transmitted to the first wireless device, in which each wireless device includes:

an association table updater that updates, when a received packet contains an address of a source wireless device and an identification number of the communication terminal connected to the source wireless device, an association table that stores the address of the source wireless device and the identification number of the communication terminal in association with each other, a destination setter that sets the address of the source wireless device obtained from the association table as a destination of a packet addressed to the communication terminal;

a correction packet obtainer that obtains the correction packet for correcting the address of the source wireless device stored in the association table; and an association table corrector that corrects, among addresses of wireless devices stored in the association table, an address of a wireless device corresponding to the identification number of the communication terminal contained in the correction packet obtained by the correction packet obtainer, to the address of the wireless device contained in the correction packet.

Preferably, the identification number of the communication terminal is a MAC address of the communication terminal.

A communication control method according to a fourth aspect of the present disclosure includes:

an association table updating step of updating, when receiving from a first wireless device a packet containing an identification number of a first communication terminal connected to the first wireless device, an association table storing an address of the wireless device and the identification number of the communication terminal in association with each other; and a correction packet transmitting step of transmitting, when a packet received from a second wireless device to which a second communication terminal is connected contain an address of the second wireless device, an identification number of the second communication terminal, and an identification number indicating a destination of the packet, and when the identification number indicating the destination is the identification number of the first communication terminal stored in the association table, a correction packet containing the address of the second wireless device and the identification number of the second communication terminal to the first wireless device after the packet is transmitted to the first wireless device.

A program according to a fifth aspect of the present disclosure causes a computer to execute:

an association table updating step of updating, when receiving from a first wireless device a packet containing an identification number of a first communication terminal connected to the first wireless device, an association table storing an address of the wireless device and the identification number of the communication terminal in association with each other; and a correction packet transmitting step of transmitting, when a packet received from a second wireless device to which a second communication terminal is connected contains an address of the second wireless device, an identification number of the second communication terminal, and an identification number indicating a destination of the packet, and when the identification number indicating the destination is the identification number of the first communication terminal stored in the association table, a correction packet containing the address of the second wireless device and the identification number of the second communication terminal to the first wireless device after the packet is transmitted to the first wireless device.

A program according to a sixth aspect of the present disclosure causes a computer to execute:

an association table updating step of updating, when a received packet contains an address of a source wireless device and an identification number of a communication terminal connected to the source wireless device, an association table that stores the address of the source wireless device and the identification number of the communication terminal in association with each other, a destination setting step of setting the address of the source wireless device obtained from the association table as a destination of a packet addressed to the communication terminal;

a correction packet obtaining step of obtaining the correction packet for correcting the address of the source wireless device stored in the association table; and an association table correcting step of correcting, among addresses of wireless devices stored in the association table, an address of a wireless device corresponding to the identification number of the communication terminal contained in the correction packet obtained in the correction packet obtaining step to the address of the wireless device contained in the correction packet.

Advantageous Effects of Invention

According to the present disclosure, a direct communication between the communication terminals is enabled, thereby reducing a system load.

BRIEF DESCRIPTION OF DRAWINGS

FIG. 10A is a diagram illustrating an example of an IP packet including an association table deleting packet according to the embodiment;

FIG. 10B is a diagram to explain a general format of the association table deleting packet according to the embodiment;

FIG. 14 is a diagram illustrating an example of the IP packet including received data from an LTE network according to the embodiment;

FIG. 20A is a diagram illustrating an example of the IP packet including an association table updating packet to the in-vehicle wireless device according to the embodiment;

FIG. 20B is a diagram illustrating an example of the IP packet including an association table updating packet to another in-vehicle wireless device according to the embodiment.

DESCRIPTION OF EMBODIMENTS

Figure 1:
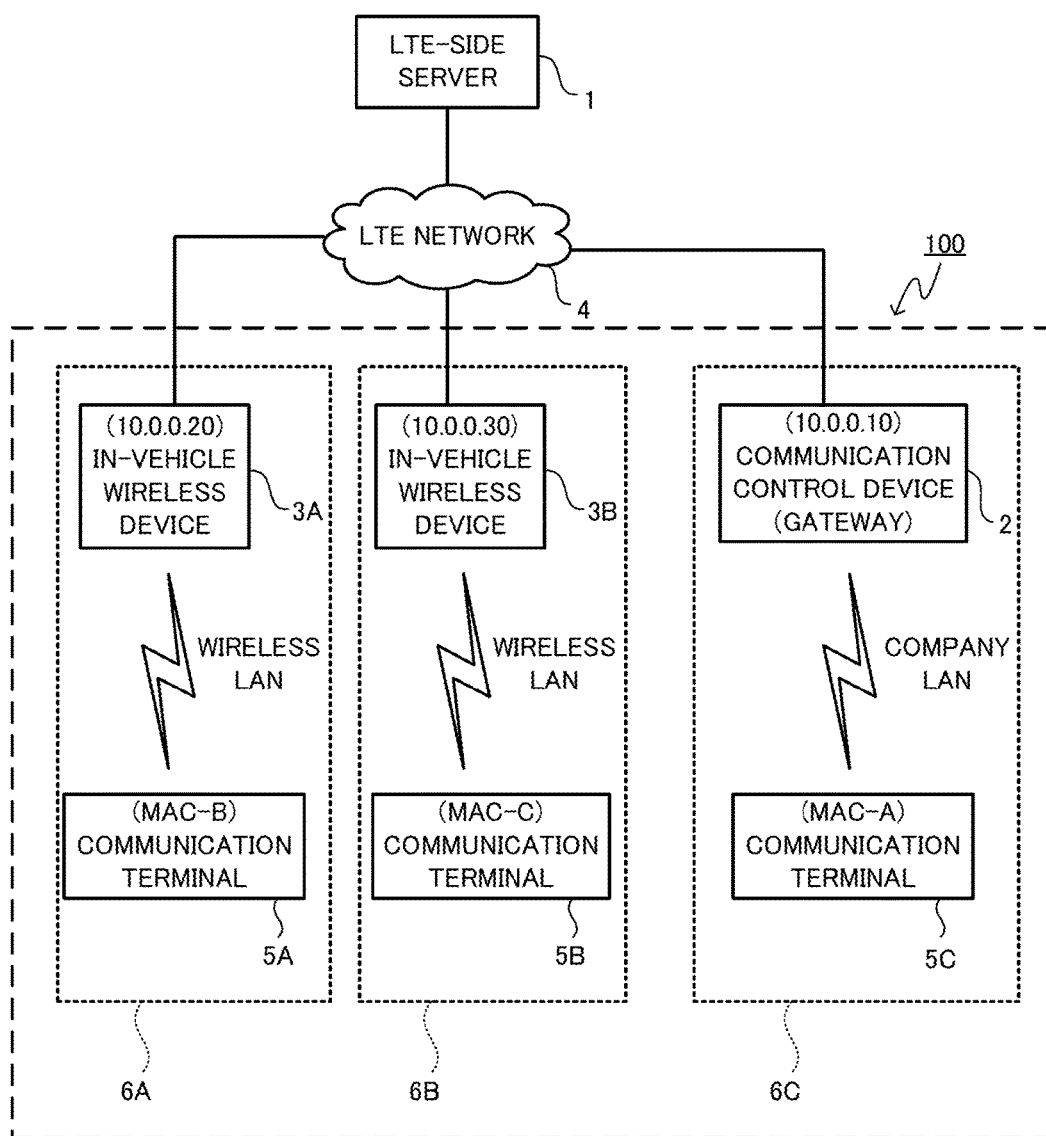
FIG. 1 is a diagram illustrating a system structure example of a communication control system according to an embodiment of the present disclosure.

A communication control device, a wireless device, a communication control system, a communication control method, and a program according to an embodiment of the present disclosure will be described in detail with reference to the drawings. Throughout the drawings, the same or corresponding portions are denoted by the same reference numeral.

Embodiment

As illustrated in FIG. 1, a communication control system 100 according to an embodiment of the present disclosure includes a communication control device 2, and two or more in-vehicle wireless devices 3 (3A and 3B). The communication control device 2 and the in-vehicle wireless device 3 are connected via an LTE network 4 that is a closed area network, and an LTE-side server 1 is also connected to the LTE network 4. In addition, the communication control device 2 and the in-vehicle wireless devices 3 construct different local area networks (LANs) 6 (6A to 6C), and communication terminals 5 (5A to 5C) are connected to the respective LANs 6 (6A to 6C).

The LTE-side server 1 is a computer connected to the LTE network 4. The LTE-side server 1 stores LTE identification numbers (ICCID: IC card identifier) of all the in-vehicle wireless devices 3 managed by a user. In addition, the LTE-side server 1 also stores the IP addresses in the LTE network 4 of the communication control device 2 and the in-vehicle wireless device 3. In this embodiment, as an example, the IP address of the in-vehicle wireless device 3A is set to be 10.0.0.20, the IP address of the in-vehicle wireless device 3B is set to be 10.0.0.30, and the IP address of the communication control device 2 is set to be 10.0.0.10.

The communication control device 2 is a gateway connecting the LTE network 4 with the LAN 6C. The LAN 6C connecting the communication control device 2 and the communication terminal 5C illustrated in FIG. 1 may be a wired LAN or a wireless LAN. In FIG. 1, the LAN 6C is described as "company LAN", but this merely indicates an example of the LAN 6C, and is not limited to the company LAN. The LAN 6C is not limited to a particular type as long as the LAN 6 is connected to the LTE network 4 via the communication control device 2, and may be, for example, a home LAN.

The in-vehicle wireless device 3 is a wireless device including an LTE communication function and a wireless LAN access point function. In this embodiment, the wireless device is described as "in-vehicle", but is not necessary to be in-vehicle type, and may be a stationary wireless device or a portable wireless device like a handy type as long as such a wireless device has the LTE communication function and the wireless LAN access point function. In addition, the in-vehicle wireless device 3 may have a communication interface that can be connected to the communication terminal 5 via a wired LAN.

The LTE network 4 is a network that mediates communication by LTE between the communication control device 2 and the in-vehicle wireless device 3. In this embodiment, the network is described as the LTE network, but is not limited to LTE. Any networks other than the LTE network and different from the LAN 6 illustrated in FIG. 1 are applicable as long as such a network enables communication by IP. In this embodiment, when communication data (packets) of the communication terminal 5 is communicated via the LTE network 4 between the communication control device 2 and the in-vehicle wireless device 3, the packets are encapsulated using user datagram protocol (UDP), and then the communication data is transmitted and received. A packet represents a small chunk of data obtained by division of data flowing through the communication network by a predetermined length, and includes a header including information on a destination and a source, and a data body (payload).

The communication terminal 5 is a terminal capable of communicating with the in-vehicle wireless device 3 or the communication control device 2 through connection to the LAN 6. Examples of the communication terminal 5 include a smartphone and a tablet that are connectable to the in-vehicle wireless device 3 via a wireless LAN, and a personal computer (PC) connectable to the communication control device 2 via a LAN. Allocated to each communication terminal 5 is a terminal identification number for uniquely identifying the terminal. The terminal identification number is, for example, a media access control (MAC) address. The terminal identification number is not limited to a number, and may be a character string. In this embodiment, as an example case, the MAC address of the communication terminal 5A is MAC-B, the MAC address of the communication terminal 5B is MAC-C, and the MAC address of the communication terminal 5C is MAC-A. In addition, in this example, an assumption is given to a case in which the communication terminal 5A and the communication terminal 5B are tablets and the communication terminal 5C is a PC, but the present disclosure is not limited to this case. Note that the function of the communication terminal 5 may be built in the in-vehicle wireless device 3.

The LAN 6 is a short-distance network that can communicate by IP. In FIG. 1, the LAN 6A and the LAN 6B are wireless LANs, but when the in-vehicle wireless device 3 has a wired LAN communication interface, the LANs may be a wired LAN or a combination LAN of a wired LAN with a wireless LAN.

The communication control system 100 is a system enabling a first communication terminal 5A connected to the first in-vehicle wireless device 3A by the first LAN 6A, and a second communication terminal 5B connected to the second in-vehicle wireless device 3B by the second LAN 6B to communicate with each other via the LTE network 4. The communication control device 2 of the communication control system 100 performs communication control for enabling such a communication. More specifically, the packet transmitted from the first communication terminal 5A with the second communication terminal 5B being as a destination is initially transferred from the first in-vehicle wireless device 3A to the communication control device 2, and the communication control device 2 controls the packet so as to reach the second communication terminal 5B via the second in-vehicle wireless device 3B. The second and subsequent packets having the same source and destination do not need to be relayed by the communication control device 2 but are directly communicable between the first in-vehicle wireless device 3A and the second in-vehicle wireless device 3B. A structure for accomplishing such a communication scheme will be described step by step. First, the communication control device 2 will be described.

Figures 2, 3:
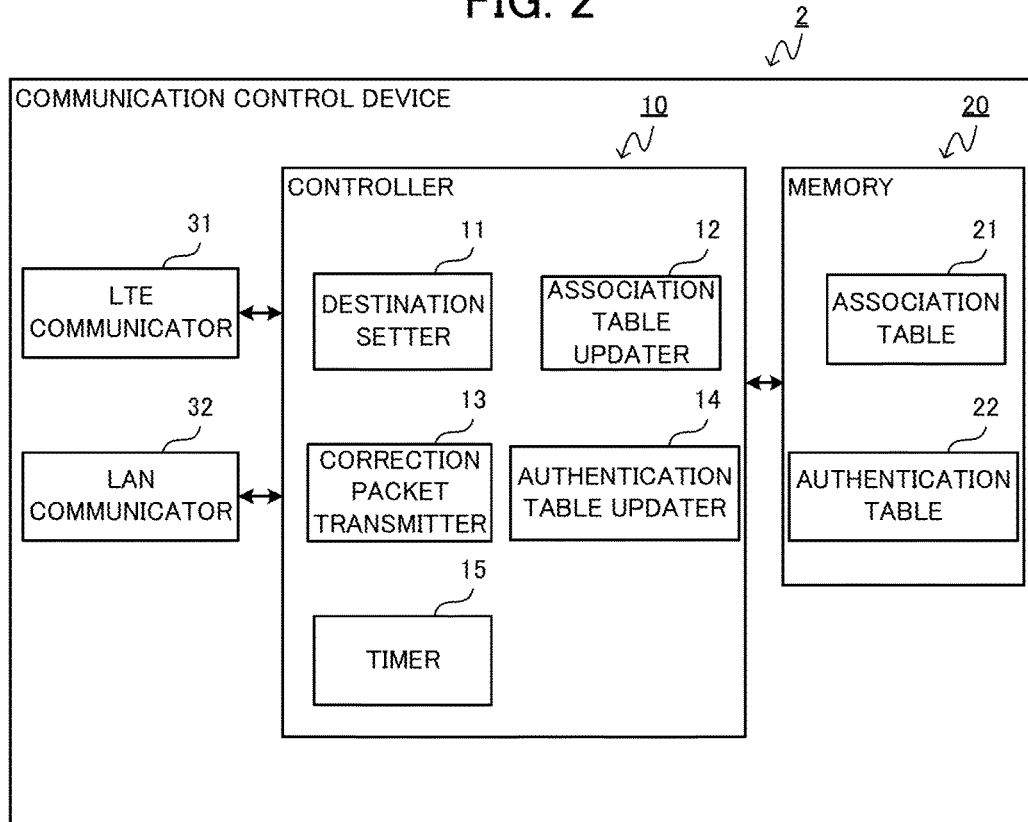
FIG. 2 is a functional block diagram of a communication control device according to the embodiment.
FIG. 3 is a diagram illustrating an example of an association table according to the embodiment.

As illustrated in FIG. 2, the communication control device 2 includes, as a functional structure, a controller 10, a memory 20, an LTE communicator 31, and a LAN communicator 32.

The controller 10 includes a central processing unit (CPU), and executes a program stored in the memory 20, thereby accomplishing the functions of the respective components of the communication control device 2 (a destination setter 11, an association table updater 12, a correction packet transmitter 13, and an authentication table updater 14). Details of these components will be described later. The controller 10 supports the multi-thread function, and is capable of running multiple threads (flows of different processes) in parallel. In addition, the controller 10 also has a timer 15, and can measure time.

The memory 20 includes a read only memory (ROM), a random access memory (RAM), and the like. The ROM stores programs to be executed by the CPU of the controller 10, and data necessary in advance for executing the program. The RAM stores data that is created or changed during the program execution. In addition, the memory 20 functionally includes an association table 21 and an authentication table 22.

As illustrated in FIG. 3, the association table 21 is a table that stores, as a pair, the association relationship between the IP address of the in-vehicle wireless device 3 in the LTE network 4 and the terminal identification number (MAC address) of the communication terminal 5 connected to the LAN 6 by the access point function of the in-vehicle wireless device 3. In addition, the association table 21 also stores the terminal identification number (MAC address) of the communication terminal 5 connected to the LAN 6 to which the communication control device 2 is connected, in which the terminal identification number is associated with the IP address (for example, loopback address) indicating that the communication terminal 5 is present in the local network (the LAN 6 to which the communication control device 2 is connected).

Figures 4, 5:
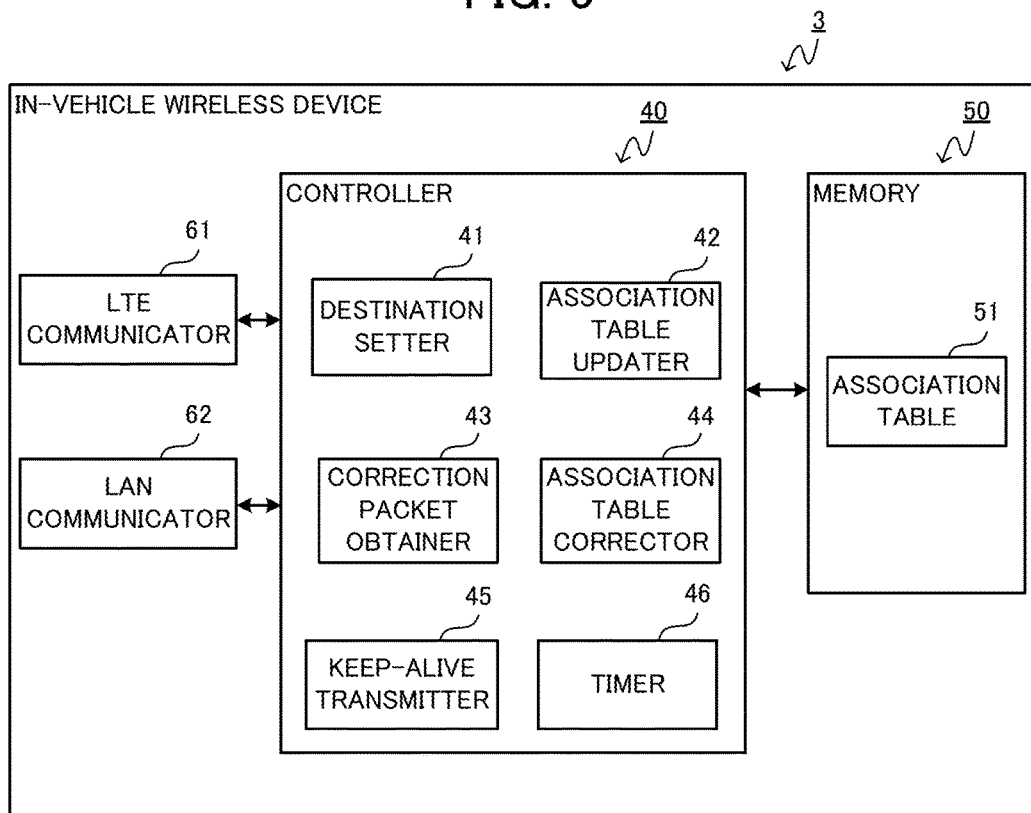
FIG. 4 is a diagram illustrating an example of an authentication table according to the embodiment.
FIG. 5 is a functional block diagram of an in-vehicle wireless device according to the embodiment.

As illustrated in FIG. 4, the authentication table 22 is a table that stores the LTE identification number (ICCID) of the in-vehicle wireless device 3, the IP address of the in-vehicle wireless device 3 in the LTE network 4, the power state of the in-vehicle wireless device 3, and the last receiving time of the keep-alive packet transmitted from the in-vehicle wireless device 3. The keep-alive packet will be described later.

Here, the description returns to each component accomplished by the controller 10 of the communication control device 2. The destination setter 11 sets an IP address that is a destination (transfer destination) of the received packet based on the association table 21.

The association table updater 12 associates the IP address (source IP address) of the source of the received packet with the terminal identification number (source terminal identification number) of the source contained in the received packet, and updates the association table 21.

The correction packet transmitter 13 transmits information (correction packet) for correcting the information stored in an association table 51 of the in-vehicle wireless device 3 to be described later via the LTE communicator 31.

The authentication table updater 14 updates the authentication table 22 based on the keep-alive packet transmitted from the in-vehicle wireless device 3 and received via the LTE communicator 31.

The LTE communicator 31 is a wireless interface for the communication control device 2 to communicate with various devices, such as the in-vehicle wireless device 3 and the LTE-side server 1 connected to the LTE network 4.

The LAN communicator 32 is a communication interface for the communication control device 2 to communicate with the communication terminal 5 connected to the LAN 6 to which the communication control device 2 is connected. The LAN communicator 32 may be a wireless interface, a wired interface, or a combination of a wireless interface and a wired interface.

Next, the in-vehicle wireless device 3 will be described. As illustrated in FIG. 5, the in-vehicle wireless device 3 includes, as a functional structure, a controller 40, a memory 50, an LTE communicator 61, and a LAN communicator 62. Since those are common to the controller 10, memory 20, LTE communicator 31 and LAN communicator 32 of the communication control device 2 in many points, the difference will be described below.

The controller 40 accomplishes the functions of respective components (a destination setter 41, an association table updater 42, a correction packet obtainer 43, an association table corrector 44, and a keep-alive transmitter 45) of the in-vehicle wireless device 3. Among these components, since the destination setter 41 and the association table updater 42 have the same functions as those of the destination setter 11 and association table updater 12 of the communication control device 2, respectively, other components that are the correction packet obtainer 43, the association table corrector 44 and the keep-alive transmitter 45 will be described below. In addition, the control unit 40 supports the multi-thread function, capable of running multiple threads (flows of different processes) in parallel, and has a timer 46 that can measure the time, which are the same as the controller 10 of the communication control device 2.

The memory 50 functionally includes an association table 51. Like the association table 21 of the communication control device 2, the association table 51 stores, as a pair, the association relationship between the IP address of the in-vehicle wireless device 3 in the LTE network 4 and the terminal identification number (MAC address) of the communication terminal 5 connected to the wireless LAN 6 by the access point function of the in-vehicle wireless device 3. In addition, like the LTE communicator 31 of the communication control device 2, the LTE communicator 61 is a wireless interface for the in-vehicle wireless device 3 to communicate with various devices, such as the communication control device 2, the in-vehicle wireless device 3, and the LTE-side server 1, connected to the LTE network 4. Still further, like the LAN communicator 32 of the communication control device 2, the LAN communicator 62 is a communication interface for the in-vehicle wireless device 3 to communicate with the communication terminal 5 connected to the LAN 6 by the access point function of the in-vehicle wireless device 3.

The correction packet obtainer 43 obtains the correction packet transmitted by the correction packet transmitter 13 of the communication control device 2.

The association table corrector 44 corrects the information stored in the association table 51 based on the correction packet obtained by the correction packet obtainer 43.

Figures 6, 7:
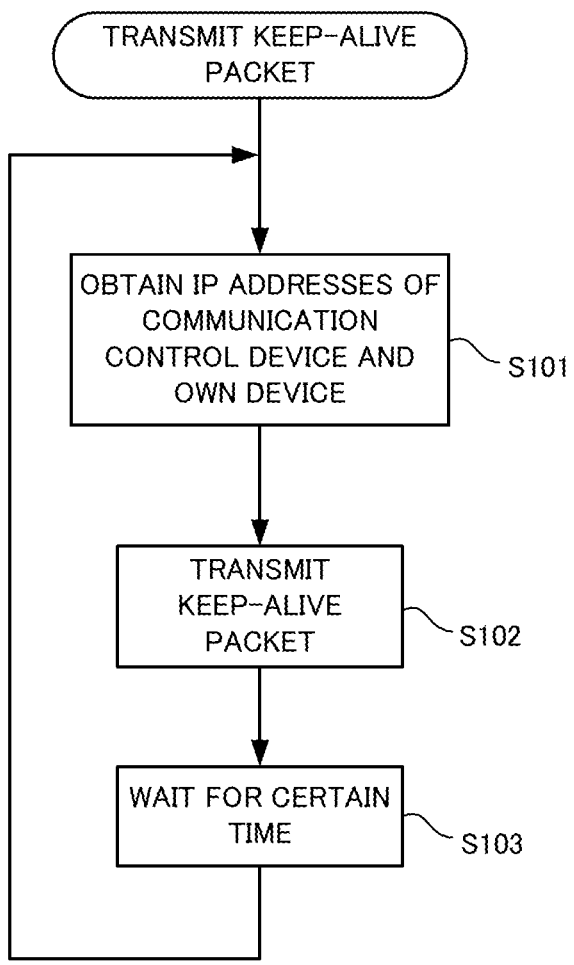
FIG. 6 is a diagram illustrating an example of a keep-alive packet according to the embodiment.
FIG. 7 is a flowchart of a keep-alive packet transmitting process by the in-vehicle wireless device according to the embodiment.

The keep-alive transmitter 45 periodically transmits the keep-alive packet (for example, at an interval of one minute) to the communication control device 2. As illustrated in FIG. 6, the keep-alive packet includes the IP address (destination IP address) in the LTE network 4 of the communication control device 2 that is the destination of the keep-alive packet, the IP address (source IP address) in the LTE network 4 assigned to the own in-vehicle wireless device 3, and a password (including the information on the LTE identification number of this in-vehicle wireless device 3) for certifying that this in-vehicle wireless device 3 is under the management by the user. The password (including the information on the LTE identification number of this in-vehicle wireless device 3) is stored in the memory 50.

Next, in order to enable the communication terminal 5A connected to the in-vehicle wireless device 3A via the wireless LAN 6A to directly transmit data (packets) to the communication terminal 5B connected to the other in-vehicle wireless device 3B via the wireless LAN 6B, a scheme of causing the in-vehicle wireless device 3A to store, in the association table 51, the IP address of the in-vehicle wireless device 3B connected to the communication terminal 5B that is the destination of the packet will be described in sequence.

First, transmission and reception of keep-alive packet for the communication control device 2 to know the IP address of each in-vehicle wireless device 3 will be described.

With reference to FIG. 7, a process of transmitting the keep-alive packet by the in-vehicle wireless device 3 will be described. This process is launched as a thread when the in-vehicle wireless device 3 is powered ON, and is kept running in parallel with other processes (other threads) in the background until the power is turned OFF.

First, the controller 40 communicates with the LTE-side server 1 via the LTE communicator 61, and obtains the IP address (the destination IP address of the keep-alive packet) in the LTE network 4 of the communication control device 2, and the IP address (the source IP address of the keep-alive packet) in the LTE network 4 of this own in-vehicle wireless device 3 (step S101).

Next, the keep-alive transmitter 45 creates the keep-alive packet illustrated in FIG. 6 from the password information including the information on the LTE identification number of the own in-vehicle wireless device 3 and the information on the IP address obtained in the step S101, and transmits the keep-alive packet to the communication control device 2 via the LTE communicator 61 (step S102). Next, the controller 40 waits for a certain time (for example, one minute) using the timer 46 (step S103), and returns the process to the step S101.

Through the above processes, the in-vehicle wireless device 3 becomes able to periodically transmit the keep-alive packet to the communication control device 2. In addition, by periodically receiving this keep-alive packet, the communication control device 2 is capable of confirming that the m-vehicle wireless device 3 indicated by the IP address contained in the keep-alive packet is alive (communicable).

Figure 8:
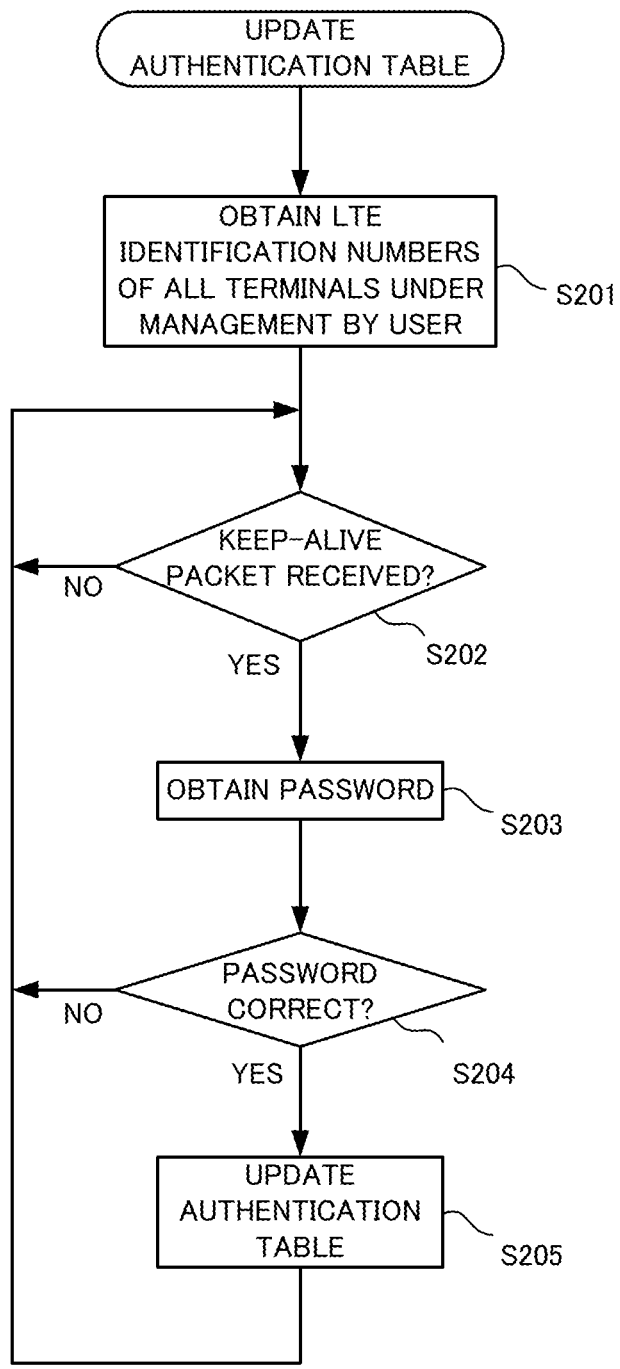
FIG. 8 is a flowchart of an authentication table updating process by the communication control device according to the embodiment.
Figure 9:
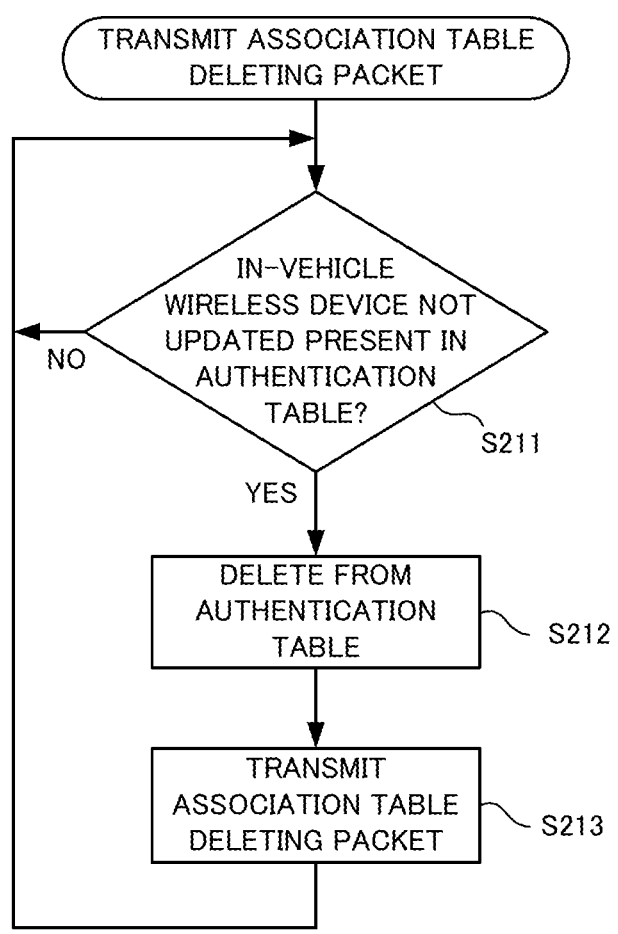
FIG. 9 is a flowchart of an association table deleting packet transmitting process by the communication control device according to the embodiment.

Next, a process of causing the communication control device 2 to update the information on the "communicable in-vehicle wireless device 3" stored in the authentication table 22 of the communication control device 2 based on the information contained in the keep-alive packet will be described with reference to FIGS. 8 and 9. When the communication control device 2 is turned ON, these processes are launched as a thread, and are kept running in the background in parallel with other processes (other threads) until the power is turned OFF.

First, the process in FIG. 8 will be described. First, the controller 10 communicates with the LTE-side server 1 via the LTE communicator 31, and obtains the LTE identification numbers of all the in-vehicle wireless devices 3 managed by the user (step S201). At this time, the password information for authenticating the validity of the in-vehicle wireless device 3 is also obtained. The controller 10 stores the obtained LTE identification number in the entry of "LTE identification number (ICCID)" of the authentication table 22 illustrated in FIG. 4. The controller 10 may also store the obtained password information in the authentication table 22.

Next, the controller 10 determines whether the keep-alive packet from the in-vehicle wireless device 3 is received via the LTE communicator 31 (step S202). When not received (step S202: No), the determination in the step S202 is repeated until the keep-alive packet is received.

When the keep-alive packet has been received (step S202: Yes), the authentication table updater 14 obtains the password contained in the keep-alive packet (step S203), and determines whether the password is correct (step S204). As for whether the password is correct is determined based on the password information obtained from the LTE-side server 1 in the step S201. When the password is incorrect (step S204: No), this keep-alive packet is ignored since such a packet is arrived from an unauthorized wireless device, and the process returns to the step S202.

When the password is correct (step S204; YES), the keep-alive packet is clarified as arrived from the authorized in-vehicle wireless device 3 managed by the user. Hence, the authentication table updater 14 updates the authentication table 22 based on the information contained in the keep-alive packet (step S205).

The update of the authentication table 22 is performed by the authentication table updater 14 as for the row of the entry in which the LTE identification number obtained from the password portion of the keep-alive packet is entered in the entry of "LTE IDENTIFICATION NUMBER" in the authentication table 22 illustrated in FIG. 4. The authentication table updater 14 enters the value of the "SOURCE IP ADDRESS" contained in the keep-alive packet in the entry of "IP ADDRESS" in this row, and enters "ON" in the entry of "POWER", and further enters the present value of the timer 15 in the entry of "LAST TRANSMISSION TIME". In FIG. 4, in order to facilitate understanding, the "LAST TRANSMISSION TIME" is indicated in the form of year, month, day, hour, minute, and second, but in the entry of "LAST TRANSMISSION TIME", a simple integer value indicating the value of the timer 15 may be entered.

Through the above process, the entry of "LAST TRANSMISSION TIME" in the authentication table 22 is updated at any time by the keep-alive packet from the communicable in-vehicle wireless device 3. When, however, the in-vehicle wireless device 3 suddenly becomes unable to communicate, there is a possibility such that the entry of "POWER" in the authentication table 22 is left as "ON" and other entries are left as undeleted. Therefore, the determination on whether each in-vehicle wireless device 3 is currently communicable should be determined based on whether the difference between the value in the entry of "LAST TRANSMISSION TIME" in the authentication table 22 and the value of the present time is equal to or smaller than a predetermined value.

Hence, a process by the communication control device 2 of, when finding the incommunicable in-vehicle wireless device 3, storing the information thereof in the authentication table 22, and transmitting the correction packet (association table deleting packet) for letting the other in-vehicle wireless devices 3 know the information of this uncommunicable in-vehicle wireless device 3 will be described with reference to FIG. 9.

First, the controller 10 calculates the difference between the value of the entry of "LAST TRANSMISSION TIME" and the present value of the timer 15 in each row where the entry of "POWER" in the authentication table 22 is "ON", and determines whether there is the in-vehicle wireless device 3 having such a difference that is larger than a predetermined value (for example, 5 minutes) (the entry of "LAST TRANSMISSION TIME" in the authentication table 22 is not updated) (step S211). When there is no in-vehicle wireless device 3 that has the entry of "LAST TRANSMISSION TIME" in the authentication table 22 not been updated (step S211: No), the determination in the step S211 is repeated until the in-vehicle wireless device 3 that is not updated is found.

When there is the in-vehicle wireless device 3 having the entry of "LAST TRANSMISSION TIME" not updated (step S211: YES), the authentication table updater 14 enters, as for the row corresponding to the in-vehicle wireless device 3 in the authentication table 22, "OFF" in the entry of "POWER", and deletes the information in the entry of "IP ADDRESS" (step S212). Next, the correction packet transmitter 13 transmits the correction packet (association table deleting packet) as illustrated in FIG. 10A to all the in-vehicle wireless devices 3 having the entry of "POWER" in the authentication table 22 being as "ON" (step S213), and returns the process to the step S211.

Through the above process, the in-vehicle wireless device 3 that has become uncommunicable due to the un-arrival of the radio wave of the LTE network 4 or power OFF is deleted from the authentication table 22 of the communication control device 2, and the association table deleting packet is transmitted to all the in-vehicle wireless devices 3 that are powered ON.

FIG. 10A illustrates an IP packet (an IP packet including an association table deleting packet) to be transmitted from the communication control device 2 with an IP address of 10.0.0.10 to the powered-ON in-vehicle wireless device 3 with an IP address of 10.0.0.20 when there is only one in-vehicle wireless device 3 that becomes uncommunicable, and the IP address thereof is 10.0.0.40. As illustrated in FIG. 10B, the general format of the association table deleting packet can collectively specify multiple IP addresses to be deleted. In this figure, flag represents the type of correction packet. There are two types of correction packets that are an association table deleting packet (the correction packet with flag that is 2) described in this paragraph, and an association table updating packet (the correction packet with flag that is 1) which will be described later. Since the association table deleting packet is illustrated in FIG. 10B, the value of flag is 2. When the correction packet is transmitted, another port of UDP is utilized (the port number indicating the correction packet is set as the destination port of the UDP header), enabling a distinction from other packets.

Through the updating process of the authentication table 22 as described above, each entry of the authentication table 22 is updated as needed. For example, in the example of the authentication table 22 illustrated in FIG. 4, the IP address of the in-vehicle wireless device 3 with the LTE identification number that is ICCID1 is 10.0.0.20, the IP address of the in-vehicle wireless device 3 with the LTE identification number that is ICCID3 is 10.0.0.30, those two in-vehicle wireless devices are powered ON, and are periodically transmitting the keep-alive packet. In addition, although the in-vehicle wireless device 3 with the LTE identification number that is ICCID2 was capable of communicating with the communication control device 2 40 minutes ago, the power is not OFF or the LTE radio wave cannot arrive, thus becoming uncommunicable presently. Still further, the communication control device 2 has never received the keep-alive packet from the in-vehicle wireless device 3 with the LTE identification number that is ICCID4 ever since the activation. That is, ever since the activation of the communication control device 2, the in-vehicle wireless device 3 with the LTE identification number that is ICCID4 is being in a power-OFF state or in a state in which the LTE radio wave cannot arrive.

Figure 11:
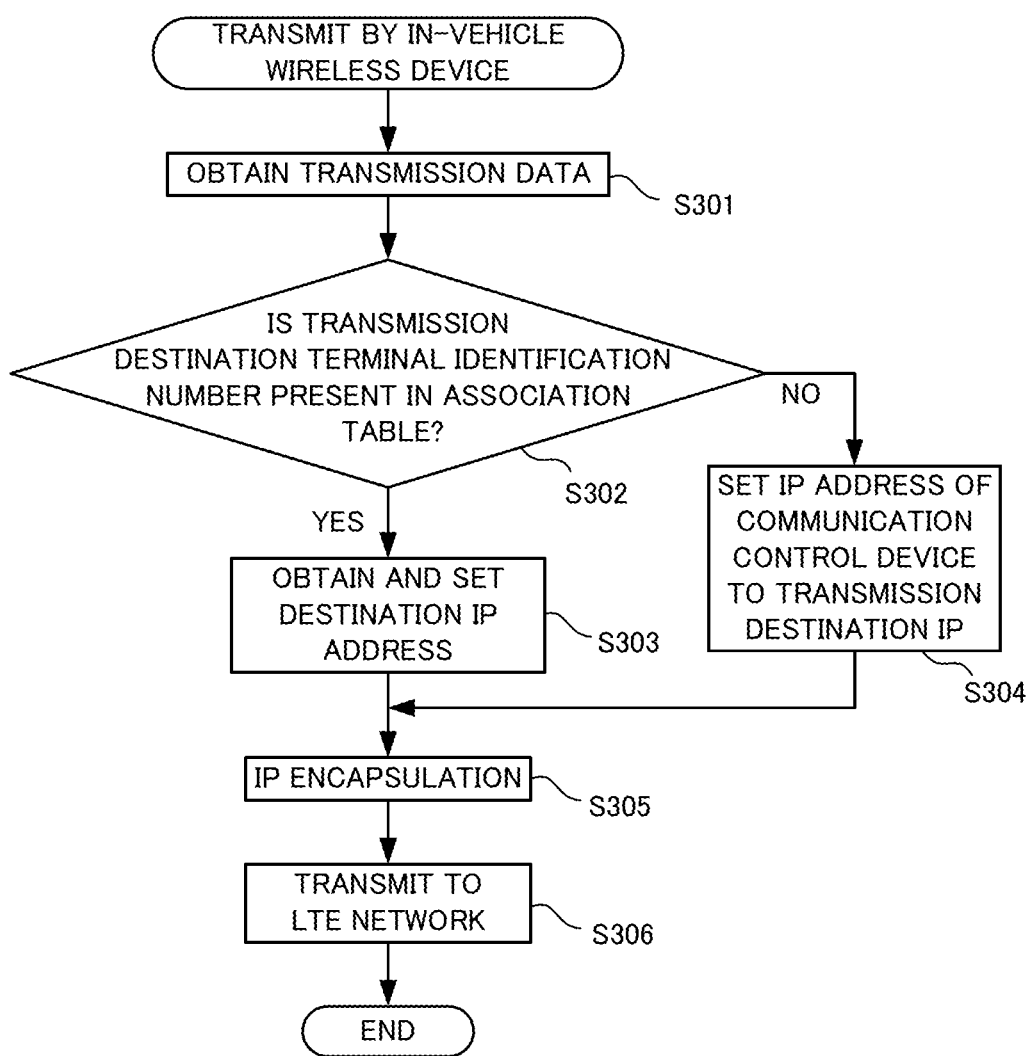
FIG. 11 is a flowchart of a transmitting process by the in-vehicle wireless device according to the embodiment.

Next, the processes of the respective devices when data is transmitted from the communication terminal 5 connected to the in-vehicle wireless device 3 via the LAN 6 to the communication terminal 5 connected to the other LAN 6 via the LTE network 4 will be described step by step. First, the process of transmitting, when the in-vehicle wireless device 3 receives data (packet) to be transmitted from the communication terminal 5 connected via the LAN 6 to the communication terminal 5 connected to the other LAN 6, such data to the LTE network 4 will be described with reference to FIG. 11.

First, the controller 40 obtains the transmission data (terminal transmission packet) transmitted from the communication terminal 5 via the LAN communicator 62 (step S301). As is indicated by the "TERMINAL TRANSMISSION PACKET" in FIG. 12, this transmission data contains, in addition to the data itself (the payload of the terminal transmission packet), the terminal identification number (destination terminal identification number) of the destination (the communication terminal 5 connected to the other LAN 6) of the transmission data, and the terminal identification number (source terminal identification number) of the source (the own communication terminal 5).

Next, the destination setter 41 determines whether the destination terminal identification number contained in the transmission data is present in the association table 51 (step S302). When the destination terminal identification number contained in the transmission data is present in the association table 51 (step S302: YES), the destination setter 41 obtains an IP address corresponding to this destination terminal identification number from the association table 51, and sets this IP address as the destination IP address (step S303). When the destination terminal identification number contained in the transmission data is not present in the association table 51 (step S302: NO), the destination setter 41 sets the IP address of the communication control device 2 as the destination IP address (step S304).

Next, the destination setter 41 encapsulates the terminal transmission packet, to which the flag is added, as a payload of a UDP packet (step S305). In accordance with the source IP address (the IP address of this in-vehicle wireless device 3) and the destination IP address set as described above, the flag is set to "1" for the transmission from the in-vehicle wireless device 3 to the communication control device 2, "2" for the transmission from the communication control device 2 to the in-vehicle wireless device 3, and "3" for the transmission from the in-vehicle wireless device 3 to the other in-vehicle wireless device 3.

Figure 12:
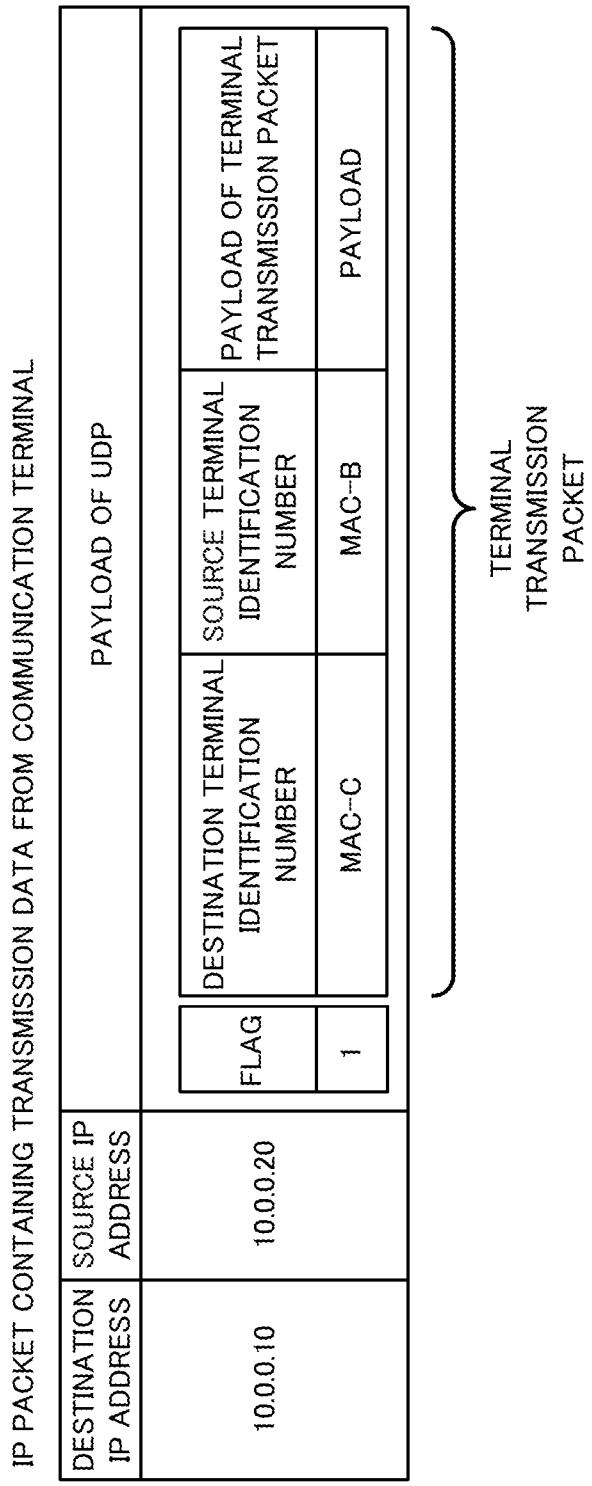
FIG. 12 is a diagram illustrating an example of the IP packet including transmitted data from the communication terminal according to the embodiment.

Next, the controller 40 transmits the IP packet as illustrated in FIG. 12 by UDP to the destination IP address set in the step S303 or S304 via the LTE communicator 61 (step S306), and ends the process.

Through the above process, the in-vehicle wireless device 3 becomes capable of directly transmitting the packets addressed to the communication terminal 5 specified by the terminal identification number stored in the association table 51 to the communication terminal 5 without via the communication control device 2. In addition, the in-vehicle wireless device 3 transmits the packets addressed to the communication terminal 5 specified by the terminal identification number not stored in the association table 51 to the communication control device 2, and thus the communication control device 2 transfers the packets to the communication terminal 5. This transfer process (the receiving process by the communication control device 2) by the communication control device 2 will be described later.

In FIG. 12, the destination terminal identification number is MAC-C, and by referring to the association table 51 in FIG. 3, the destination IP address may be set as 10.0.0.30 (No. 3), but FIG. 12 illustrates as an example case (the example case in which the process progresses from the step S302: NO to the step S304) in which the information on MAC-C has not been stored in the association table 51, and the destination IP address is set as the IP address of the communication control device 2 that is 10.0.0.10.

Figure 13:
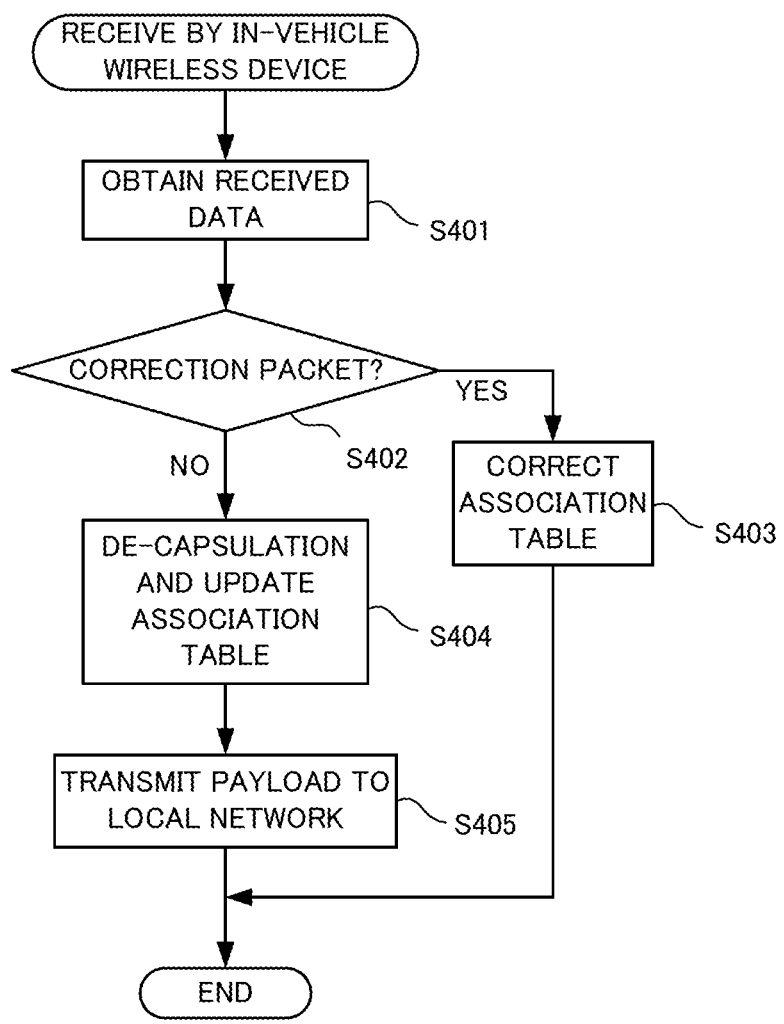
FIG. 13 is a flowchart of a receiving process by the in-vehicle wireless device according to the embodiment.

The following description is made, with reference to FIG. 13, for a process performed when, as described above, the in-vehicle wireless device 3 transmits, through the LTE network 4, the IP packet that contains the terminal transmission packet addressed to the communication terminal 5, and then the in-vehicle wireless device 3 to which the communication terminal 5 is connected receives the IP packet.

First, the controller 40 obtains data (the IP packet containing the UDP packet) received from the LTE network 4 via the LTE communicator 61 (step S401). When the IP packet is not the correction packet, as illustrated in FIG. 14, the IP address of the own in-vehicle wireless device 3 is contained in the destination IP address of the header part of the IP packet. In addition, the IP address of the in-vehicle wireless device 3 or the communication control device 2 which has transmitted the IP packet is contained in the source IP address. Still further, contained in the payload of the UDP packet is the terminal transmission packet transmitted from the source communication terminal 5 and to which flag is added.

Next, the controller 40 determines whether the IP packet is the correction packet (step S402). This determination can be made based on the destination port of the header part of the UDP packet contained in the IP packet. When the destination port at the header part of the UDP packet contains the port number for the correction packet, the IP packet is the correction packet, and when other port numbers are contained, the IP packet is not the correction packet. In the case of the correction packet (step S402: YES), the correction process on the association table 51 is performed (step S403), and the process is terminated. The correction process on the association table 51 will be described later. Since the correction packet is communicated based on the port number for the correction packet, the receiving process of the UDP packet having the port number for the correction packet specified as the destination port (the process of repeating the step S401 and the step S403 every time the correction packet is received) may be launched in the different thread, and may be run in parallel with the receiving process of other packets than the correction packet. In that case, the determination process in the step S402 in the process illustrated in FIG. 13 becomes unnecessary (the process always progresses from the step S401 to the step S404).

When the received IP packet is not the correction packet (step S402: NO), the controller 40 de-capsulates the received IP packet to obtain the destination IP address, the source IP address, and the terminal transmission packet, and the association table updater 42 updates the association table 51 using the source IP address and the source terminal identification number in the terminal transmission packet (step S404). Next, the controller 40 transmits the terminal transmission packet contained in the received IP packet to the wireless LAN 6 that is the local network via the LAN communicator 62 (step S405), and terminates the process.

The process of updating the association table 51 in the step S404 is a process of storing a pair of the source IP address and the source terminal identification number in the association table 51. When the same source terminal identification number has been already stored in the association table 51, the association table updater 42 rewrites the value of the source IP address corresponding to the source terminal identification number by the source IP address present in the IP packet received at this time. As an example, a case in which the IP packet illustrated in FIG. 14 are received with the association table 51 being in the state as illustrated in FIG. 3 will be described. Since the source terminal identification number illustrated in FIG. 14 is MAC-B, when, in the association table 51 in FIG. 3, the terminal identification number that is MAC-B is searched, the associated IP address became 10.0.0.20 (No. 1 in the association table illustrated in FIG. 3). Since the source IP address in the IP packet received at this time is 10.0.0.10, when the updating process of the association table 51 is performed in the step S404, the IP address of No. 1 in FIG. 3 will be rewritten as 10.0.0.10. However, the IP address of the in-vehicle wireless device 3A to which the communication terminal 5A having the terminal identification number that is MAC-B is connected is 10.0.0.20. Hence, the association table 51 is to be updated by improper information in the above updating process of the association table 51. In this case, a correction of the association table 51 is necessary.

The correction process of this association table 51 is performed in the above step S403 based on the correction packet transmitted from the communication control device 2, and the details of this correction process will be described later.

Although the process of transmitting and receiving by the in-vehicle wireless device 3 via the LTE network 4 has been described above, when the in-vehicle wireless device 3 does not know the IP address of the in-vehicle wireless device 3 to which the communication terminal 5 specified by the destination terminal identification number is connected (when the IP address corresponding to the terminal identification number of the communication terminal 5 has not been stored yet in the association table 51), the communication control device 2 needs to relay the IP packet, and to transmit to the in-vehicle wireless device 3 to which the communication terminal 5 is connected. When, however, the communication control device 2 also does not know the IP address of the in-vehicle wireless device 3 to which the communication terminal 5 is connected (the IP address corresponding to the terminal identification number of the communication terminal 5 is not stored in the association table 21 yet), the communication control device 2 transmits the IP packet to all the in-vehicle wireless devices 3 (other than the source) connected to the communication control device 2, whereby the IP packet is transmitted to the in-vehicle wireless device 3 to which the communication terminal 5 is connected.

Figure 15:
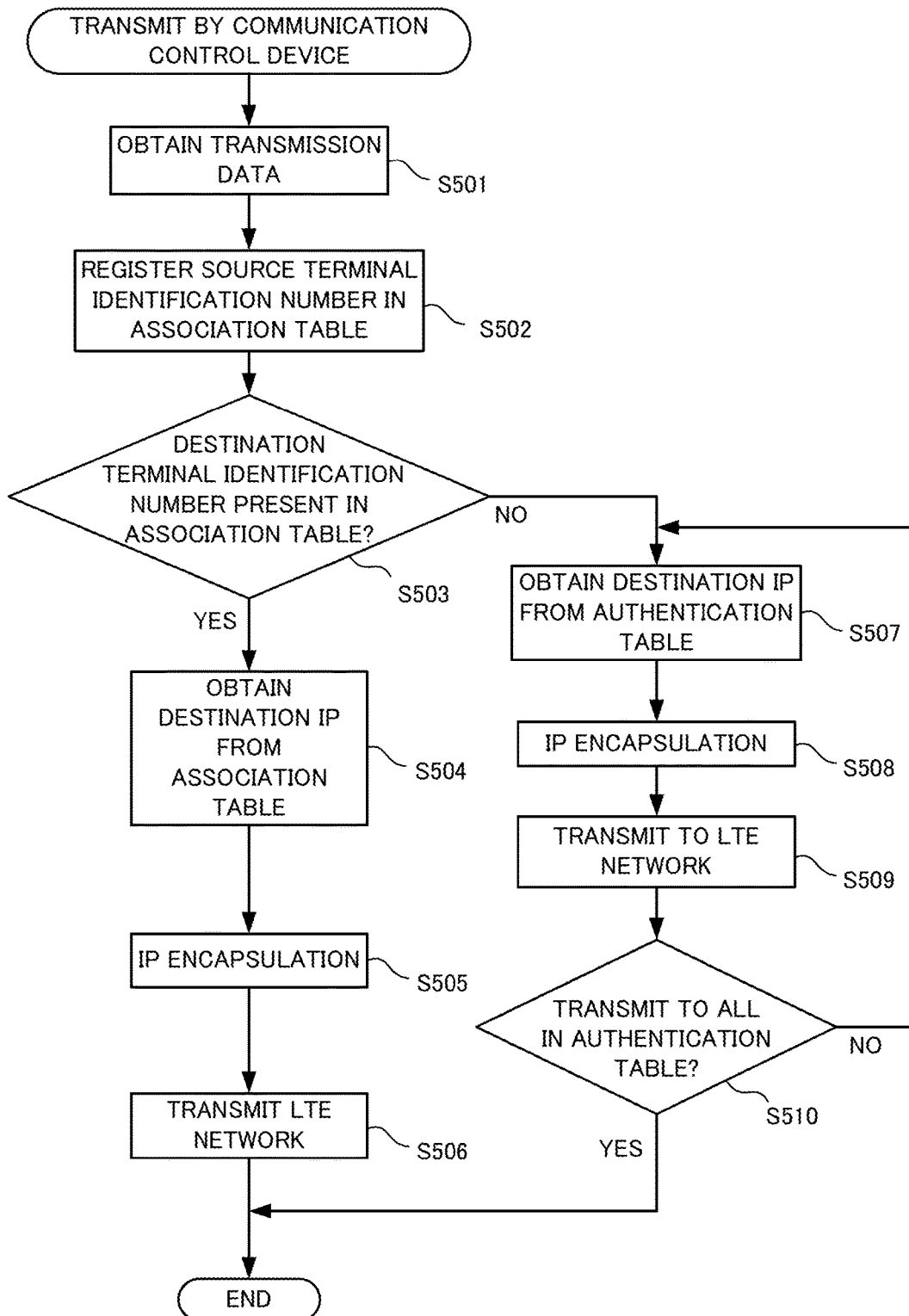
FIG. 15 is a flowchart of a transmitting process by the communication control device according to the embodiment.

The scheme of such a communication control device 2 will be described step by step. First, with reference to FIG. 15, a process of transmitting, to the LTE network 4, data (packet) transmitted from the communication terminal 5 (that is connected to the LAN 6 to which the communication control device 2 is connected) and received by the communication control device 2 will be described.

First, the controller 10 obtains the transmission data (terminal transmission packet) transmitted from the communication terminal 5 via the LAN communicator 32 (step S501). As illustrated in the "TERMINAL TRANSMISSION PACKET" in FIG. 16, this transmission data contains, in addition to the data itself (payload of the terminal transmission packet), the terminal identification number (destination terminal identification number) of the destination (the communication terminal 5 connected to the other LAN 6) of the transmission data, and the terminal identification number (source terminal identification number) of the source (the communication terminal 5 connected to the communication control device 2 and the LAN 6).

Next, in order to indicate that the communication terminal 5 specified by the source terminal identification number is the communication terminal 5 connected to the LAN 6, the controller 10 stores the source terminal identification number in the association table 21 (step S502). As is indicated by No. 6 in FIG. 3, the IP address corresponding to the source terminal identification number is set to be a value indicating that the communication terminal 5 is present in the local network, and is stored. According to No. 6 in FIG. 3, the IP address set to be the loopback address (127.0.0.1) indicates that the communication terminal 5 having the terminal identification number that is MAC-A is present in the local network.

Next, the destination setter 11 determines whether the destination terminal identification number contained in the transmission data is present in the association table 21 (step S503). When the destination terminal identification number contained in the transmission data is present in the association table 21 (step S503: YES), the destination setter 11 obtains the IP address corresponding to the destination terminal identification number from the association table 21, and sets the obtained IP address as the destination IP address (step S504).

Next, the controller 10 encapsulates the terminal transmission packet to which the flag is added as the payload of the UDP packet (step S505). This flag is the same as that described in the process of the step S305 in FIG. 11, but in the transmitting process by the communication control device 2, since the transmission is always from the communication control device 2 to the in-vehicle wireless device 3, the flag is always set to be 2. Hence, by this encapsulation "PAYLOAD OF UDP" as illustrated in FIG. 16 is created.

Figure 16:
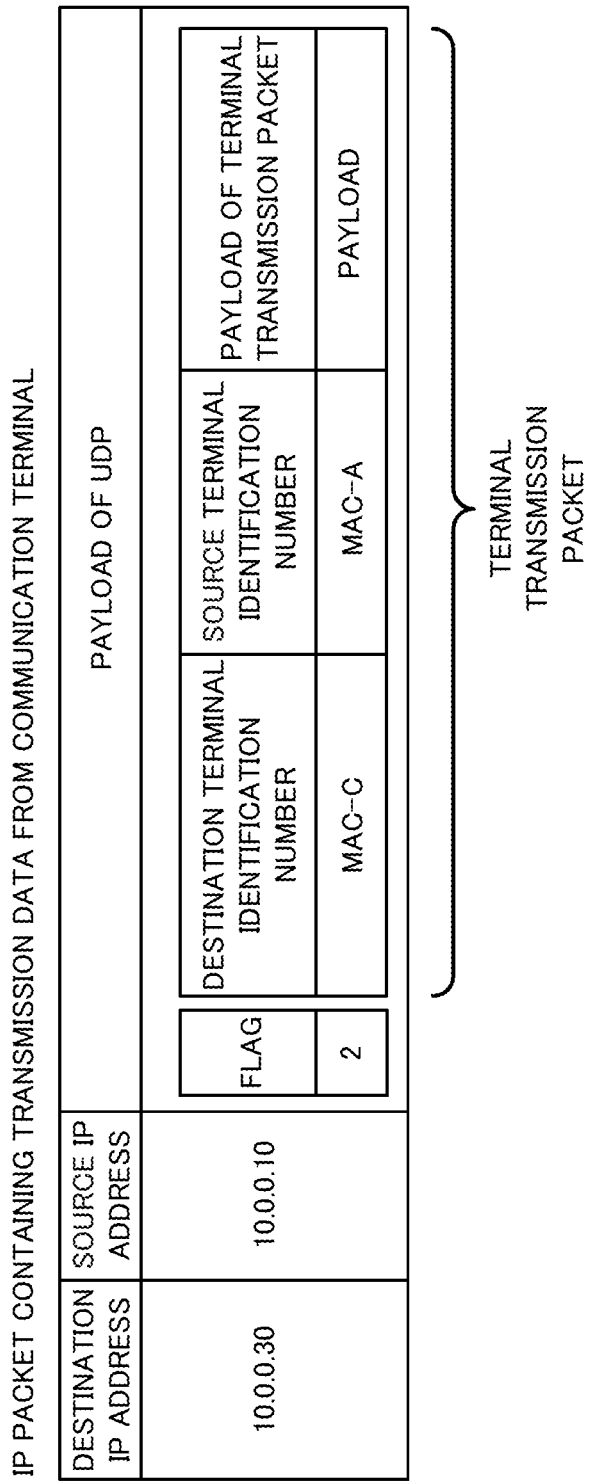
FIG. 16 is a diagram illustrating an example of the IP packet including transmitted data from the communication terminal according to the embodiment.

Next, the controller 10 transmits the IP packet as illustrated in FIG. 16 by UDP toward the destination IP address set in the step S504 via the LTE communicator 31 (step S506), and terminates the process.

In the step S503, when the destination terminal identification number contained in the transmission data is not present in the association table 21 (step S503: NO), the communication control device 2 transmits, to all the powered-ON in-vehicle wireless devices 3 among the in-vehicle wireless devices 3 stored in the authentication table 22, the transmission data. Accordingly, the destination setter 11 first obtains the IP address of the first powered-ON in-vehicle wireless device 3 from the authentication table 22, and sets the obtained IP address as the destination IP address (step S507).

Next, the controller 10 encapsulates the terminal transmission packet to which the flag is added as the payload of the UDP packet (step S508). This flag is the same as that described in the process of the step S305 in FIG. 11, but in the transmitting process by the communication control device 2, since the transmission is always from the communication control device 2 to the in-vehicle wireless device 3, the flag is always set to be 2. Hence, by this encapsulation, "PAYLOAD OF UDP" as illustrated in FIG. 16 is created.

Next, the controller 10 transmits the IP packet as illustrated in FIG. 16 by UDP toward the destination IP address set in the step S507 via the LTE communicator 31 (step S509). Subsequently, the controller 10 determines whether the transmission has been made to all the powered-ON in-vehicle wireless devices 3 in the authentication table 22 (step S510).

When the transmission has been made to all the in-vehicle wireless devices 3 (step S510: YES), the process is terminated. When the transmission has not been completed yet to all the in-vehicle wireless devices (step S510: NO), the process returns to step the S507, and the destination setter 11 obtains the IP address of the next destination from the authentication table 22.

Through the above process, the IP packet containing the transmission data (terminal transmission packet) addressed to the communication terminal 5 with the terminal identification number that is not stored in the association table 21 are transmitted by the communication control device 2 to all the powered-ON in-vehicle wireless devices 3. Consequently, when the power of the in-vehicle wireless device 3 connected to the communication terminal 5 that is the destination of the terminal transmission packet is ON, the IP packet containing the terminal transmission packet is transmitted to this in-vehicle wireless device 3, and this in-vehicle wireless device 3 transmits the terminal transmission packet to the communication terminal 5.

As described above, when the in-vehicle wireless device 3 does not know the IP address of the in-vehicle wireless device 3 connected to the communication terminal 5 specified by the destination terminal identification number (when the IP address corresponding to the terminal identification number of the communication terminal 5 has not been stored in the association table 51 yet), the IP packet from the in-vehicle wireless device 3 are transmitted to the communication control device 2, but when the communication control device 2 also does not know the IP address of the in-vehicle wireless device 3 connected to the communication terminal 5 (when the IP address corresponding to the terminal identification number of the communication terminal 5 has not been stored yet in the association table 21), the IP packet is transmitted to all the in-vehicle wireless devices 3 (other than the source) connected to the communication control device 2, and thus the IP packet is to be transmitted to the in-vehicle wireless device 3 connected to the communication terminal 5. As for the scheme of such a communication control device 2, next, a process when the communication control device 2 receives the IP packet transmitted from the in-vehicle wireless device 3 via the LTE network 4 will be described with reference to FIG. 17.

Figure 18:
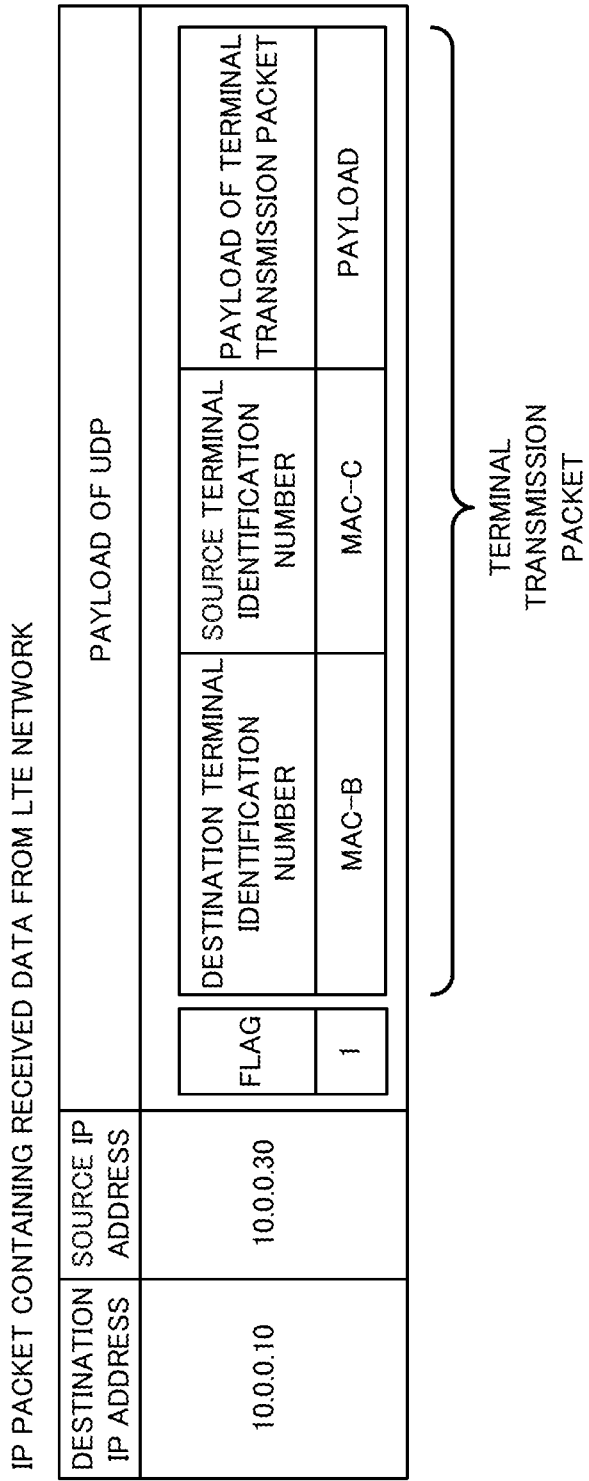
FIG. 18 is a diagram illustrating an example of the IP packet including received data from the LTE network according to the embodiment.

First, the controller 10 obtains data (the IP packet containing the UDP packet) received from the LTE network 4 via the LTE communicator 31 (step S601). The IP packet contain, as illustrated in FIG. 18, in the destination IP address at the IP header part, the IP address of the communication control device 2 that is the own device. In addition, the IP address of the in-vehicle wireless device 3 that has transmitted the IP packet is contained in the source IP address. Still further, the payload of the UDP packet contains the terminal transmission packet transmitted from the source communication terminal 5 and to which flag is added.

Next, the controller 10 do-capsulates the received IP packet, obtains the destination IP address, the source IP address, and the terminal transmission packet, and the association table updater 12 updates the association table 21 using the source IP address and the transmission source terminal identification number within the terminal transmission packet (step S602). The update of the association table 21 is the same as the process in the step S404 in FIG. 13. As an example, a case in which the communication control device 2 receives the IP packet illustrated in FIG. 18 when the association table 21 is in the state illustrated in FIG. 3 will be described. Since the source terminal identification number illustrated in FIG. 18 is MAC-C, when, in the association table 21 in FIG. 3, the terminal identification number that is MAC-C is searched, the associated IP address became 10.0.0.30 (No. 3 in the association table illustrated in FIG. 3). Since the source IP address in the IP packet received at this time is 10.0.0.30, in this case, nothing is necessary in the updating process of the association table 21 in the step S602. If there is no row where the terminal identification number is MAC-C in the association table 21, in the step S602, the association table updater 12 registers, in the association table 21, the same details as those of No. 3 in the association table 21 illustrated in FIG. 3.

Next, the destination setter 11 determines whether the destination terminal identification number contained in the received IP packet is present in the association table 21 (step S603). When present (step S603: YES), the destination setter 11 determines whether the communication terminal 5 specified by the destination terminal identification number is present in the local network (step S604). With reference to the association table 21, when the IP address corresponding to the destination terminal identification number is the IP address indicating the local network (for example, a loopback address (127.0.0.1)), the determination can be made such that the communication terminal 5 specified by the destination terminal identification number is present in the local network. When the communication terminal 5 specified by the destination terminal identification number is present in the local network (step S604: YES), the controller 10 transmits the terminal transmission packet obtained by de-capsulation in the step S602 via the LAN communicator 32 to the communication terminal 5 connected to the LAN 6 (step S605), and terminates the process.

When the communication terminal 5 specified by the destination terminal identification number is not present in the local network (step S604: NO), the destination setter 11 obtains the IP address corresponding to the destination terminal identification number from the association table 21, and sets the obtained IP address as the destination IP address (step S606). When, for example, the details in the association table 21 are the details illustrated in FIG. 3, and when the IP packet illustrated in FIG. 18 is received, MAC-B that is the destination terminal identification number in the terminal transmission packet illustrated in FIG. 18 corresponds to, with reference to the association table 21 illustrated in FIG. 3, the IP address that is 10.0.0.20 (No. 1 in FIG. 3). Hence, the destination IP address is set to be 10.0.0.20.

Next, the controller 10 encapsulates the terminal transmission packet to which the flag is added as the payload of the UDP packet (step S607). This flag is the same as that described in the process of the step S305 in FIG. 11, but in the transmitting process by the communication control device 2, since transmission is always from the communication control device 2 to the in-vehicle wireless device 3, the flag is always set to be 2. When, for example, the details of the association table 21 are the details illustrated in FIG. 3, and when the IP packet illustrated in FIG. 18 is received, as described above, since the destination IP address is set to be 10.0.0.20, and the flag is set to be 2, the transmission packet as illustrated in FIG. 19 created in the step S607.

Figure 19:
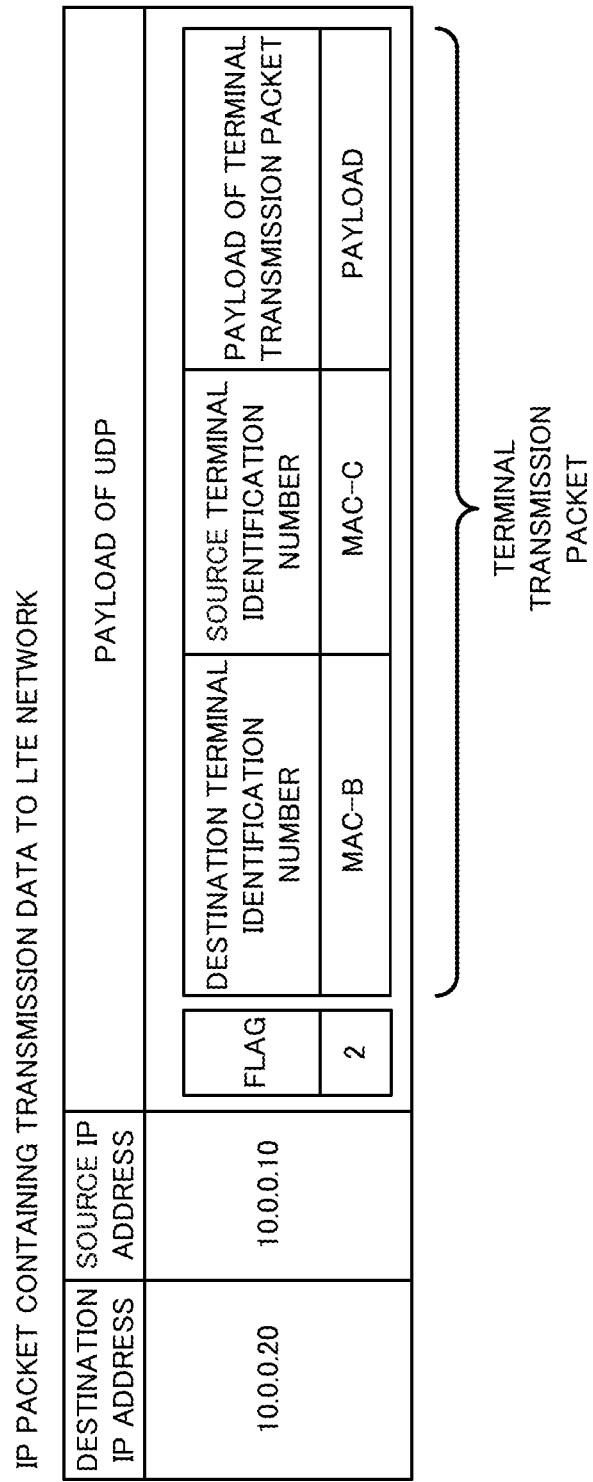
FIG. 19 is a diagram illustrating an example of the IP packet including transmitted data to the LTE network according to the embodiment.

Next, the controller 10 transmits the IP packet as illustrated in FIG. 19 by UDP toward the destination IP address set in the step S606 via the LTE communicator 31 (step S608).

Next, the controller 10 determines whether the two communication terminals 5 specified by the destination terminal identification number and the source terminal identification number in the terminal transmission packet obtained by de-capsulation in the step S602 have obtained the IP address of the in-vehicle wireless device 3 or the communication control device 2 connected via the respective LANs 6 by referring to the association table 21, and both are the IP addresses of the in-vehicle wireless device 3 (step S609). Whether the IP address is the IP address of the in-vehicle wireless device 3 can be determined by referring to the authentication table 22. When this is the IP address stored in the entry of the IP address in the authentication table 22, this is the IP address of the in-vehicle wireless device 3.

When both are the IP addresses of the in-vehicle wireless device 3 (step S609: YES), the correction packet transmitter 13 transmits the correction packet (association table updating packet) as illustrated in FIGS. 20A and 20B to the two in-vehicle wireless devices 3 (step S610), and terminates the process. When either one or both are not the IP address of the in-vehicle wireless device 3 (step S609: NO), the process is directly terminated. The details of the association table updating packet will be described later.

When the destination terminal identification number contained in the received IP packet is not present in the association table 21 in the step S603 (step S603: NO), the communication control device 2 transmits IP packet to all the powered-ON in-vehicle wireless devices 3 among the in-vehicle wireless devices 3 other than the source and stored in the authentication table 22. Accordingly, the destination setter 11 obtains the IP address of the first powered- ON in-vehicle wireless device 3 among the in-vehicle wireless devices 3 other than the source from the authentication table 22, and sets the obtained IP address as the destination IP address (step S611).

Next, the controller 10 encapsulates the terminal transmission packet to which the flag is added as the payload of the UDP packet (step S612). The flag is the same as described in the step S607, and the flag is always set to be 2 in this case.

Next, the controller 10 transmits the IP packet as illustrated in FIG. 19 by UDP toward the destination IP address set in the step S611 via the LTE communicator 31 (step S613). Subsequently, the controller 10 determines whether or the transmission is made to all the powered-ON in-vehicle wireless devices 3 among the in-vehicle wireless devices 3 other than the source and present in the authentication table 22 (step S614).

When the transmission has been made to all the in-vehicle wireless devices 3 other than the source (step S614: YES), the controller 10 transmits the terminal transmission packet obtained by de-capsulation in the step S602 to the LAN 6 via the LAN communicator 32 (step S615), and terminates the process. When the transmission has not been completed yet to all the in-vehicle wireless devices 3 other than the source (step S614: NO), the process returns to the step S611, and the destination setter 11 obtains the IP address of the next destination from the authentication table 22.

In the above process, the communication control device 2 transmits the IP packet to the in-vehicle wireless devices 3 other than the source. However, even if the IP packet is transmitted to the source in-vehicle wireless device 3, such IP packet is discarded, and there is no technical problem in practice. The description for the sequential processes when the communication control device 2 receives the data (packet) from the LTE network 4 will end in this paragraph, but a supplementary description will be given for the association table updating packet transmitted in the step S610.

When a communication between the in-vehicle wireless devices 3 is performed for the first time (for example, from the in-vehicle wireless device 3B to which the communication terminal 5B having the terminal identification number that is MAC-C is connected to the in-vehicle wireless device 3A to which the communication terminal 5A having the terminal identification number that is MAC-B is connected), since the IP address of the in-vehicle wireless device 3A has not been stored yet in the association table 51 of the in-vehicle wireless device 3B, the communication control device 2 relays for the communication. At this time, as illustrated in FIG. 19, for example, the IP address (10.0.0.10) of the communication control device 2 is entered in the source IP address in the IP packet relayed by the communication control device 2. In this case, in the receiving process by the in-vehicle wireless device 3A that has received the IP packet, in the step S404 in FIG. 13, the association table updater 42 determines that this IP address (10.0.0.10) is associated with the source terminal identification number that is MAC-C, and updates the association table 51 of the in-vehicle wireless device 3A. Subsequently, when a reply packet is returned from the communication terminal 5A having the terminal identification number that is MAC-B to the communication terminal 5B having the terminal identification number that is MAC-C, the transmission of the reply packet from the in-vehicle wireless device 3A to the in-vehicle wireless device 3B is relayed by the communication control device 2. Next in the receiving process by the in-vehicle wireless device 3B that has received this reply packet, the association table updater 42 determines that the IP address corresponding to the source terminal identification number that is MAC-B is the IP address (10.0.0.10) of the communication control device 2, and updates the association table 51 of the in-vehicle wireless device 3B. Such a phenomenon occurs because the communication control device 2 relays the communication between the two in-vehicle wireless devices 3.

Figure 17:
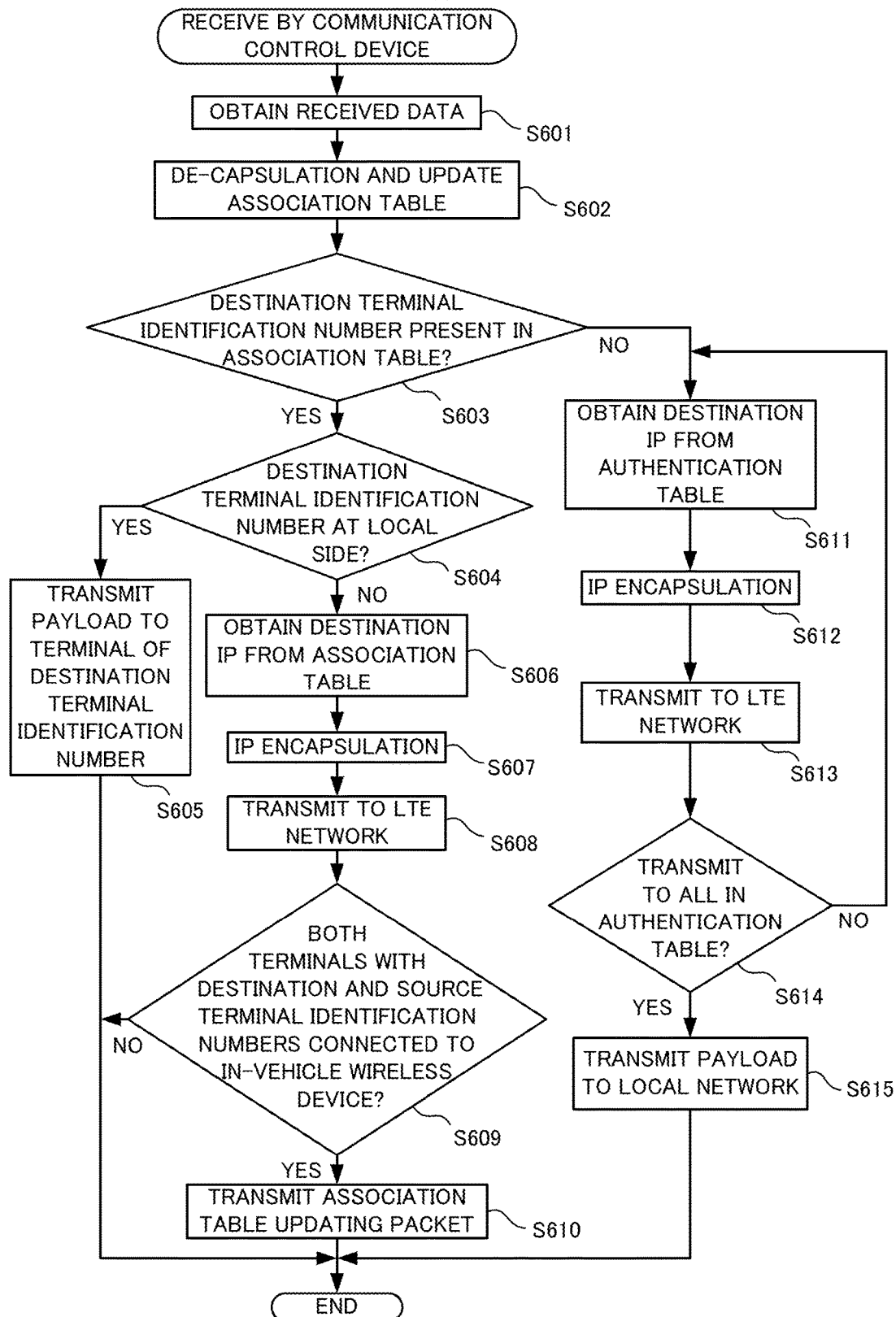
FIG. 17 is a flowchart of a receiving process by the communication control device according to the embodiment.

Hence, when the communication control device 2 relays the communication between the two in-vehicle wireless devices 3 (when the determination in the step S609 illustrated in FIG. 17 is YES), the correction packet that is transmitted by the communication control device 2 to the in-vehicle wireless device 3 serves as the association table updating packet for correcting the IP address corresponding to the terminal identification number of the communication terminal 5 connected to those two in-vehicle wireless devices 3. Since the proper IP addresses of these two in-vehicle wireless devices 3 are stored in the association table 21 of the communication control device 2, as illustrated in FIGS. 20A and 20B, the correction packet transmitter 13 sets the terminal identification number of the communication terminal 5 connected to the in-vehicle wireless device 3 that has communicated via the communication control device 2 and the IP address of the in-vehicle wireless device 3 connected to the communication terminal 5 as a pair, and transmits the association table updating packet to which the flag that is 1 indicating that this is the correction packet of the association table updating packet to each in-vehicle wireless device 3.

FIG. 20A illustrates the example of packet when the association table updating packet indicating that the IP address of the in-vehicle wireless device 3B to which the communication terminal 5B (having the terminal identification number that is MAC-C) is connected is 10.0.0.30 is transmitted to the in-vehicle wireless device 3A by the communication control device 2. FIG. 20B illustrates the example of packet when the association table updating packet indicating that the IP address of the in-vehicle wireless device 3A to which the communication terminal 5A (having the terminal identification number that is MAC-B) is connected is 10.0.0.20 is transmitted to the in-vehicle wireless device 3B by the communication control device 2.

Figure 21:
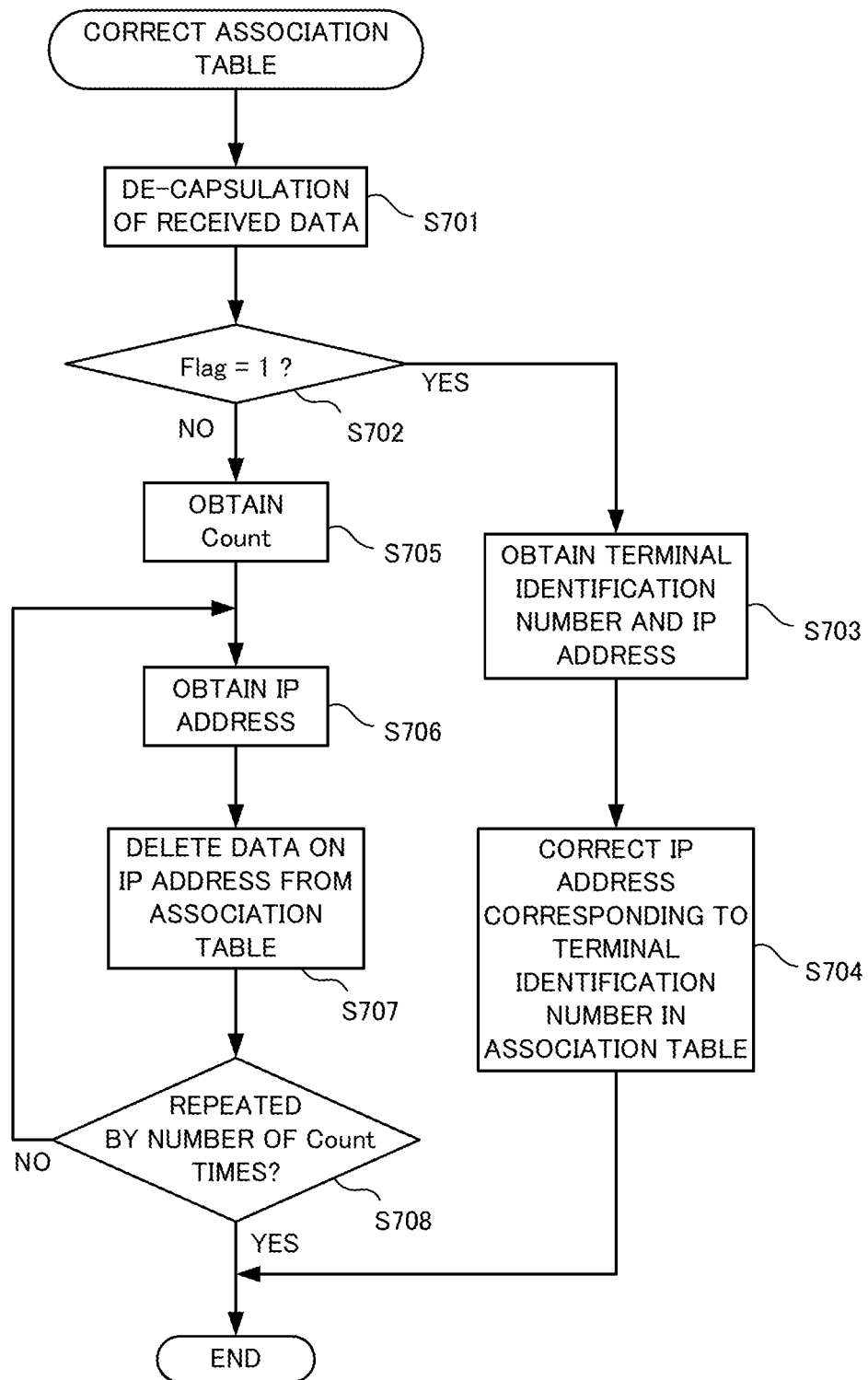
FIG. 21 is a flowchart of an association table correcting process by the in-vehicle wireless device according to the embodiment.

As described above, there are two types of correction packet that are the association table deleting packet and the association table updating packet, and the in-vehicle wireless device 3 that has received those corrects the association table 51 in the step S403 in FIG. 13. This association table correcting process will be described with reference to FIG. 21.

First, the correction packet obtainer 43 de-capsulates the received correction packet, and obtains the flag and the payload (step S701). Next, the association table corrector 44 determines whether the flag is 1 (step S702). When the flag is 1 (step S702: YES), since this is the association table updating packet, the association table corrector 44 obtains the intended terminal identification number and the corresponding IP address from the payload (step S703). Next, the association table corrector 44 corrects the IP address corresponding to the terminal identification number stored in the association table 51 to the IP address obtained in the step S703 (step S704), and terminates the process.

When the flag is not 1 (step S702: NO), since this is the association table deleting packet illustrated in FIG. 10, the association table corrector 44 obtains Count that indicates the number of IP addresses to be deleted from payload (step S705). Next, the association table corrector 44 retrieves the one IP address to be deleted from the payload (step S706), and deletes all the IP addresses and the corresponding terminal identification numbers from the association table 51 (step S707).

Next, the association table corrector 44 determines whether the processes in the steps S706 to S707 are repeated by the number of times indicated by the Count (step S708). When repeated (step S708; YES), the process is terminated. When not repeated yet (step S708: NO), the process returns to step S706.

By the above process, the association table 51 is corrected properly. After the association table 51 is corrected properly, a direct communication between the in-vehicle wireless devices 3 is enabled without via the communication control device 2, and the load on the communication control device 2 can be reduced. In addition, since the association table updating packet is transmitted only when the communication control device 2 relays the communication between the in-vehicle wireless devices 3, after the association table 51 is corrected and the in-vehicle wireless devices 3 become able to directly communicate with each other, the association table updating packet is not transmitted any more. Hence, the load on the communication control system 100 is reduced.

In the above embodiment, the description has been given of the case in which the MAC address is adopted as the terminal identification number, but any information is adoptive as long as the terminal can be uniquely identified. For example, the IP address assigned over the LAN 6 may be adopted. When the MAC address is adopted as the terminal identification number, there is an advantage such that the in-vehicle wireless device 3 can directly adopt the MAC address for the communication with the communication terminal 5.

In the above-described embodiment, the description has been given of the case in which the one communication terminal 5 is connected to the one in-vehicle wireless device 3 via the wireless LAN 6, but the number of the communication terminals 5 connected to the respective in-vehicle wireless devices 3 via the LAN 6 is optional. Likewise, the number of communication terminals 5 connected to the communication control device 2 via the LAN 6 is also optional.

In the above embodiment, the description has been given of the case in which the port number for the correction packet is set to be a different port number from those of the other packets. However, in addition to the correction packet, when the packet to transmit the terminal transmission packet from the communication terminal 5 to the LTE network 4 and the keep-alive packet utilize the different port numbers, the types of packets can be distinguished.

On the contrary to the above case, the type of packet may be distinguished by the flag so as to enable the process by a single port number. In this case, the flag is added to the keep-alive packet at a location ahead of the password illustrated in FIG. 6, and the process on these packets is distinguished based on the value of the flag. For example, flag=0 may be set for the keep-alive packet, flag=1 may be set for the association table updating packet of the correction packet, and flag=2 may be set for the association table deleting packet, and in the packet that transmit the terminal transmission packet to the LTE network 4, flag=3 may be set for the communication direction from the in-vehicle wireless device 3 to the communication control device 2, flag=4 may be set for the communication direction from the in-vehicle wireless device 3 to the communication control device 2, flag=5 may be set for the communication direction from the in-vehicle wireless device 3 to the other in-vehicle wireless device 3, and the like.

Every time the communication control device 2 stores the new association relationship between the in-vehicle wireless device 3 and the communication terminal 5 contained in the received packet in the association table 21, the communication control device 2 may transmit, to all the other in-vehicle wireless devices 3, the association relationship between the in-vehicle wireless device 3 and the communication terminal 5. However, in the present disclosure, since the correction packet is transmitted only when the new communication between the communication terminals 5 occurs, the load on the network can be reduced.

Still further, in the above embodiment, what is expected is that the IP address of the in-vehicle wireless device 3 in the LTE network 4 dynamically changes. However, when the in-vehicle wireless device 3 having the fixed IP address and the communication terminal 5 connected thereto are always the same, the fixed IP address and the terminal identification number of the communication terminal 5 connected to this in-vehicle wireless device 3 may be stored in the association tables 51 of all the in-vehicle wireless devices 3 under the management by the user. This enables the communication terminal 5 connected to the in-vehicle wireless device 3 via the LAN 6 to directly communicate with the communication terminal 5 connected to the other LAN 6 without transmitting the correction packet and without via the communication control device 2 from the beginning.

In any of the above described embodiments, each function can be achieved by a normal computer. More specifically, in the above embodiment, the description has been given of the case in which the programs to be executed by the controllers 10 and 40 are stored in the ROMs of the memories 20 and 50. However, such programs may be distributed in a manner stored in a non-transitory computer readable recording medium, such as a compact disc read only memory (CD-ROM), a digital versatile disc (DVD), or a magneto-optical disc (MO), and may be read and installed in a computer to obtain the computer that achieves the above respective functions. When the respective functions are born by an operating system (OS) and applications or accomplished by cooperative operations between the OS and the applications, only the portions other than the OS may be recorded in a non-transitory recording medium.

Still further, each program may be superimposed on carrier waves, and may be distributed via a communication network. For example, the program may be posted on a bulletin board system (BBS) over the communication network, and the program may be distributed via the network. The program is launched, and executed like the other application programs under the control of the OS, and thus a configuration to execute the above processes is accomplished.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-062464, filed on Mar. 25, 2016, the entire disclosure of which is incorporated by reference herein.

INDUSTRIAL APPLICABILITY

According to the present disclosure, a communication control device, a wireless device, a communication control system, a communication control method, and a program are provided.

REFERENCE SIGNS LIST

100 Communication control system
1 LTE-side server
2 Communication control device
3, 3A, 3B In-vehicle wireless device
4 LTE network
5, 5A, 5B, 5C Communication terminal
6, 6A, 6B, 6C LAN
10, 40 Controller
11, 41 Destination setter
12, 42 Association table updater
13 Correction packet transmitter
14 Authentication table updater
15, 46 Timer
20, 50 Memory
21, 51 Association table
22 Authentication table
31, 61 LTE communicator
32, 62 LAN communicator
43 Correction packet obtainer
44 Association table corrector
45 Keep-alive transmitter

What is claimed is:

1. A communication control device comprising:
an association table updater that updates, when receiving from a first wireless device a first packet containing an identification number of a first communication terminal connected to the first wireless device, an association table storing an address of the first wireless device and the identification number of the first communication terminal in association with each other; and
a correction packet transmitter that transmits, when a second packet received from a second wireless device to which a second communication terminal is connected contains an address of the second wireless device, an identification number of the second communication terminal, and an identification number indicating a destination of the second packet, and when the identification number indicating the destination is the identification number of the first communication terminal stored in the association table, a first correction packet containing the address of the second wireless device and the identification number of the second communication terminal to the first wireless device after the second packet is transmitted to the first wireless device,
wherein the correction packet transmitter further transmits, to the second wireless device, a second correction packet containing the address of the first wireless device and the identification number of the first communication terminal.

2. The communication control device according to claim 1, wherein the identification number of the communication terminal is a MAC address of the communication terminal.

3. A communication control system comprising a communication control device and a plurality of wireless devices,
wherein the communication control device comprises:
an association table updater that updates, when receiving from a first wireless device a first packet containing an identification number of a first communication terminal connected to the first wireless device, an association table storing an address of the first wireless device and the identification number of the first communication terminal in association with each other; and
a correction packet transmitter that transmits, when a second packet received from a second wireless device to which a second communication terminal is connected contains an address of the second wireless device, an identification number of the second communication terminal, and an identification number indicating a destination of the second packet, and when the identification number indicating the destination is the identification number of the first communication terminal stored in the association table, a first correction packet containing the address of the second wireless device and the identification number of the second communication terminal to the first wireless device after the packet is transmitted to the first wireless device,
wherein each wireless device comprises:
an association table updater that updates, when a received packet contains an address of a source wireless device and an identification number of the communication terminal connected to the source wireless device, an association table that stores the address of the source wireless device and the identification number of the communication terminal in association with each other;
a destination setter that sets the address of the source wireless device obtained from the association table as a destination of a third packet addressed to the communication terminal;
a correction packet obtainer that obtains a second correction packet for correcting the address of the source wireless device stored in the association table; and
an association table corrector that corrects, among addresses of wireless devices stored in the association table, an address of a wireless device corresponding to the identification number of the communication terminal contained in the second correction packet obtained by the correction packet obtainer, to the address of the wireless device contained in the second correction packet.

4. The communication control system according to claim 3, wherein the identification number of the communication terminal is a MAC address of the communication terminal.

5. A communication control method comprising:
an association table updating step of updating, when receiving from a first wireless device a first packet containing an identification number of a first communication terminal connected to the first wireless device, an association table storing an address of the first wireless device and the identification number of the first communication terminal in association with each other; and
a correction packet transmitting step of transmitting, when a second packet received from a second wireless device to which a second communication terminal is connected contains an address of the second wireless device, an identification number of the second communication terminal, and an identification number indicating a destination of the second packet, and when the identification number indicating the destination is the identification number of the first communication terminal stored in the association table, a first correction packet containing the address of the second wireless device and the identification number of the second communication terminal to the first wireless device after the second packet is transmitted to the first wireless device, wherein the correction packet transmitter further transmits, to the second wireless device, a second correction packet containing the address of the first wireless device and the identification number of the first communication terminal.

6. A non-transitory recording medium storing a computer program for causing a computer to execute:

an association table updating step of updating, when receiving from a first wireless device a first packet containing an identification number of a first communication terminal connected to the first wireless device, an association table storing an address of the first wireless device and the identification number of the first communication terminal in association with each other; and a correction packet transmitting step of transmitting, when a second packet received from a second wireless device to which a second communication terminal is connected contains an address of the second wireless device, an identification number of the second communication terminal, and an identification number indicating a destination of the second packet, and when the identification number indicating the destination is the identification number of the first communication terminal stored in the association table, a first correction packet containing the address of the second wireless device and the identification number of the second communication terminal to the first wireless device after the second packet is transmitted to the first wireless device, wherein the correction packet transmitter further transmits, to the second wireless device, a second correction packet containing the address of the first wireless device and the identification number of the first communication terminal.

* * * * *